United States Patent [19]
Yanagihara et al.

[11] Patent Number: 6,161,102
[45] Date of Patent: Dec. 12, 2000

[54] METHOD AND APPARATUS FOR SEARCHING FOR INFORMATION IN A DATA PROCESSING SYSTEM AND FOR PROVIDING SCHEDULED SEARCH REPORTS IN A SUMMARY FORMAT

[75] Inventors: Kazu Yanagihara, Mountain View; Steven F. Peralta, Santa Clara; Robin E. Martherus, San Jose; Gregory B. Vaughan, Santa Cruz; Matthew Holloway, San Jose, all of Calif.

[73] Assignee: Apple Computer, Inc., Cupertino, Calif.

[21] Appl. No.: 08/910,060

[22] Filed: Aug. 12, 1997

Related U.S. Application Data

[63] Continuation of application No. 08/279,949, Jul. 25, 1994, Pat. No. 5,715,443.

[51] Int. Cl.[7] .................................................. G06F 17/30
[52] U.S. Cl. ................................................. 707/3; 707/10
[58] Field of Search ........................... 707/2, 3, 10, 104; 709/201, 203, 217, 219

[56] References Cited

U.S. PATENT DOCUMENTS

| | | | |
|---|---|---|---|
| 4,451,901 | 5/1984 | Wolfe et al. | 364/900 |
| 4,870,568 | 9/1989 | Kahle et al. | 364/200 |
| 5,032,989 | 7/1991 | Tornetta | 364/401 |

(List continued on next page.)

FOREIGN PATENT DOCUMENTS

WO9008360  7/1990  WIPO .

OTHER PUBLICATIONS

Morgan, Brian, Business Objects, DBMS, Sep. 1992 v.5 n.10 pp28–30, (2)(text only).

Ratcliffe, Mitch. "Clear Access 2.0 Allows SQL Searches Off–line." MacWeek, Nov. 16, 1992, v6 n41 pp24–26(2), (text only).

Kodama, David. Query Tools: Get Information Now! Data Based Advisor, Sep. 1992 v10 n9 pp52–63(11), (text only).

Clear Access User's Guide Version 2.0. pp.1–E14, 1993 Clear Access Corporation.

ZyIndex for Dos User's Guide, Introduction and Table of Contents, Mar. 1993.

Lexis–Nexis, "The ECLIPSE Feature", Instructions. 3 pgs. 1993, Mead Data Central, Inc.

*Sonar High–Speed Text Retrieval Professional for Macintosh*, Virginia Systems Software Services, Inc., 8 pgs, Jul. 28, 1993.

GOfer Manual, 1988, pp1–24, Microlytics, Inc.

PCT International Search Report sent Nov. 24, 1995.

*Primary Examiner*—Paul V. Kulik
*Attorney, Agent, or Firm*—Blakely, Sokoloff, Taylor & Zafman

[57] ABSTRACT

A method and apparatus for processing information in a data processing system which is coupled to an information storage device having information stored therein. The method includes defining on a first processor a first search request which includes at least one parameter which specifies a first desired type of information, then performing a first search using the first request to determine whether the first type of desired information is stored in the information storage device. While performing the first search the first processor executes another process associated with searching for information in the data processing system. This other process typically includes defining a further search request and performing a further search using the further search request while the first search is being performed. The apparatus of the present invention includes a first processor coupled to the information storage device and a second processor coupled to a network to the first processor. An input device is coupled to the first processor which is used to define a first search request. According to another aspect of the invention, a first search request may be defined and the performance of the first search request may be scheduled such that a first search may be performed at a first scheduled search time or a report of the first search may be retrieved at a first scheduled time. A report in summary format is generated following performance of the first search at the first scheduled search time.

63 Claims, 16 Drawing Sheets

U.S. PATENT DOCUMENTS

| | | | |
|---|---|---|---|
| 5,150,464 | 9/1992 | Sidhu et al. | 395/200 |
| 5,179,652 | 1/1993 | Rozmanith et al. | 395/155 |
| 5,235,680 | 8/1993 | Bijnagte | 395/161 |
| 5,325,297 | 6/1994 | Bird et al. | 364/419.07 |
| 5,361,390 | 11/1994 | Heyen et al. | 395/200 |
| 5,410,692 | 4/1995 | Torres | 395/600 |
| 5,448,731 | 9/1995 | Wang et al. | 395/650 |
| 5,584,025 | 12/1996 | Keithley et al. | 395/615 |
| 5,586,240 | 12/1996 | Khan et al. | 395/769 |
| 5,592,375 | 1/1997 | Salmon et al. | 395/207 |
| 5,623,652 | 4/1997 | Vora et al. | 395/610 |
| 5,630,125 | 5/1997 | Zellweger | 395/614 |
| 5,715,443 | 2/1998 | Yanagihara et al. | |
| 5,819,273 | 10/1998 | Vora et al. | |

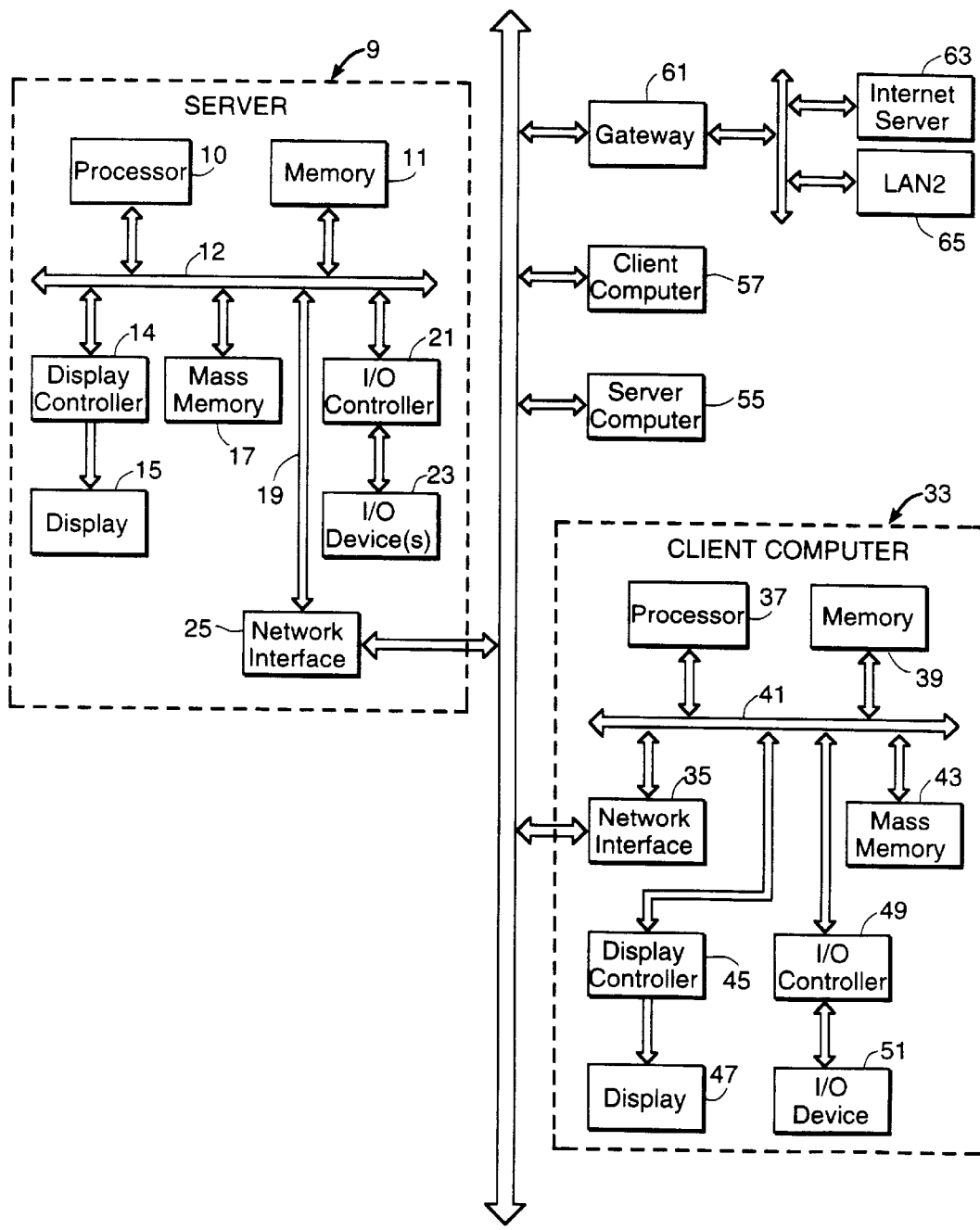
FIG_1

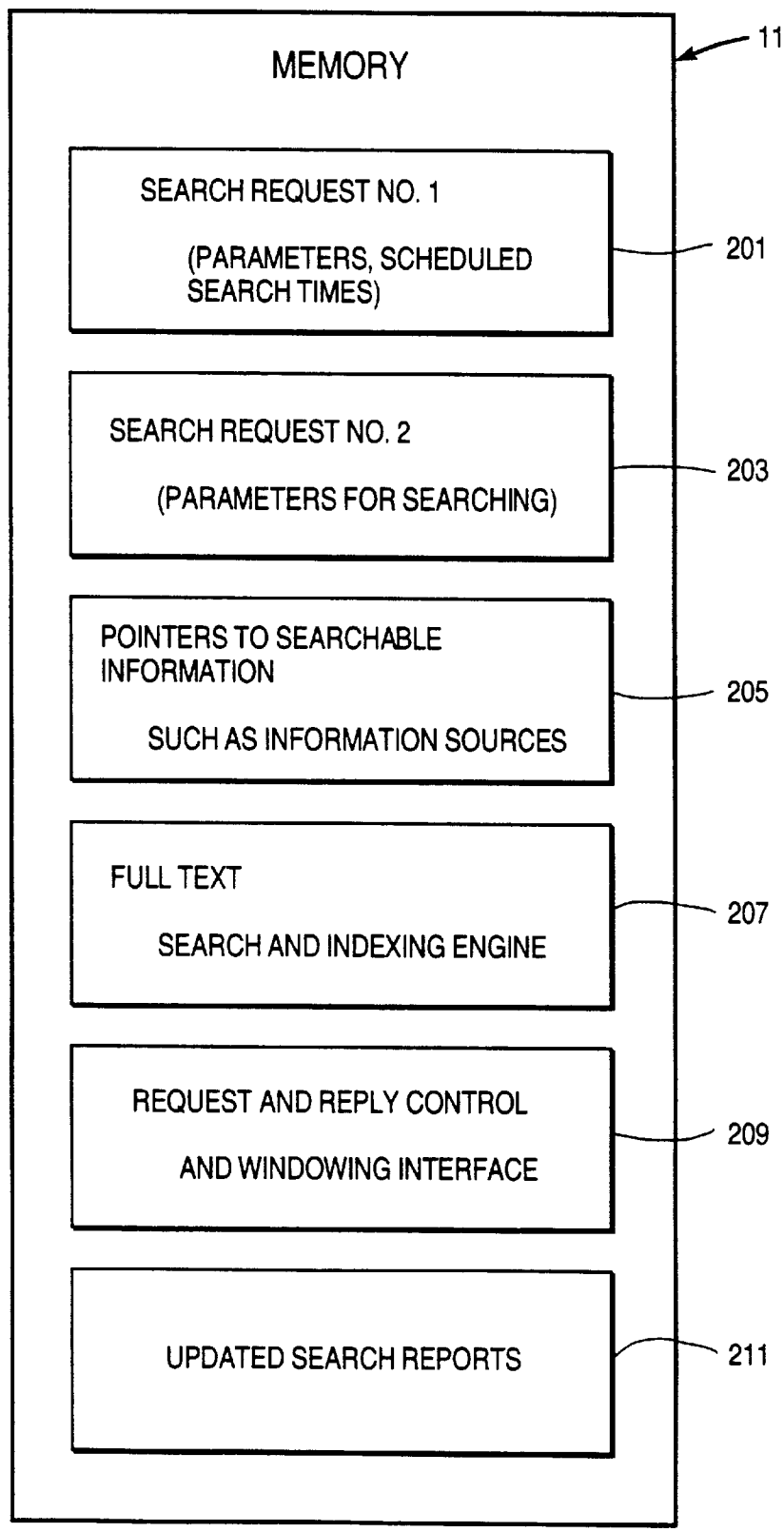
FIG_2

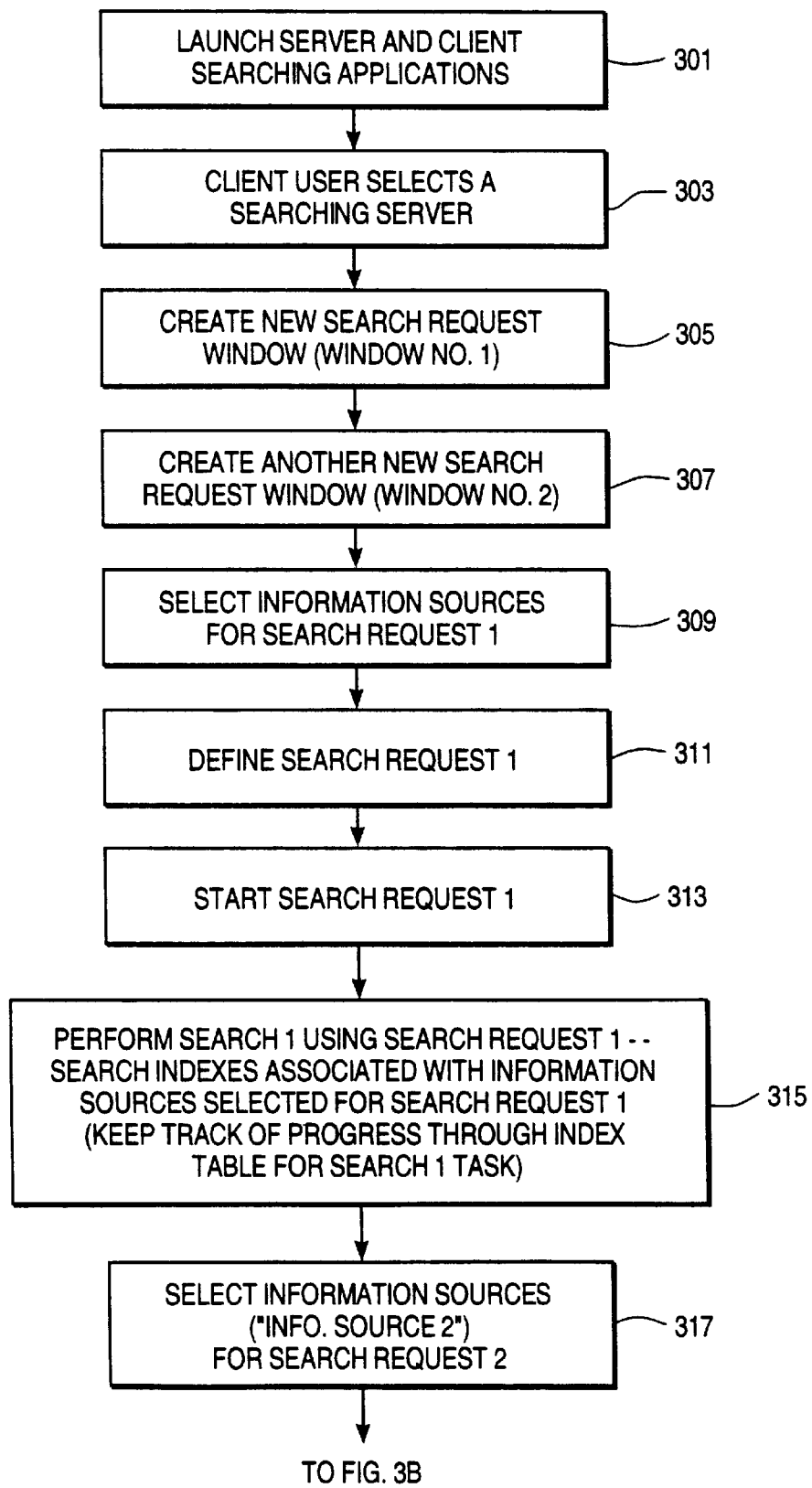
FIG_3A

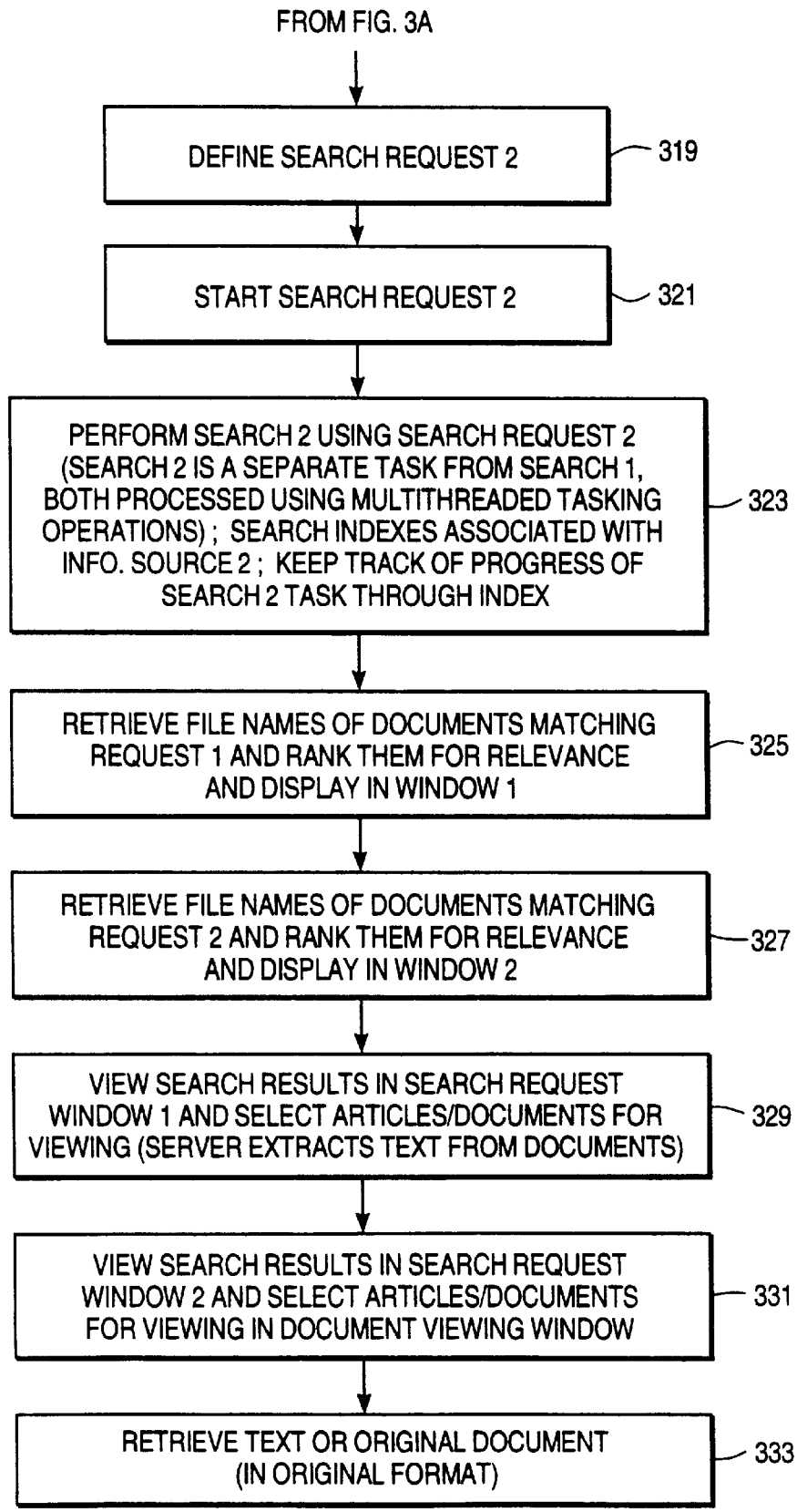

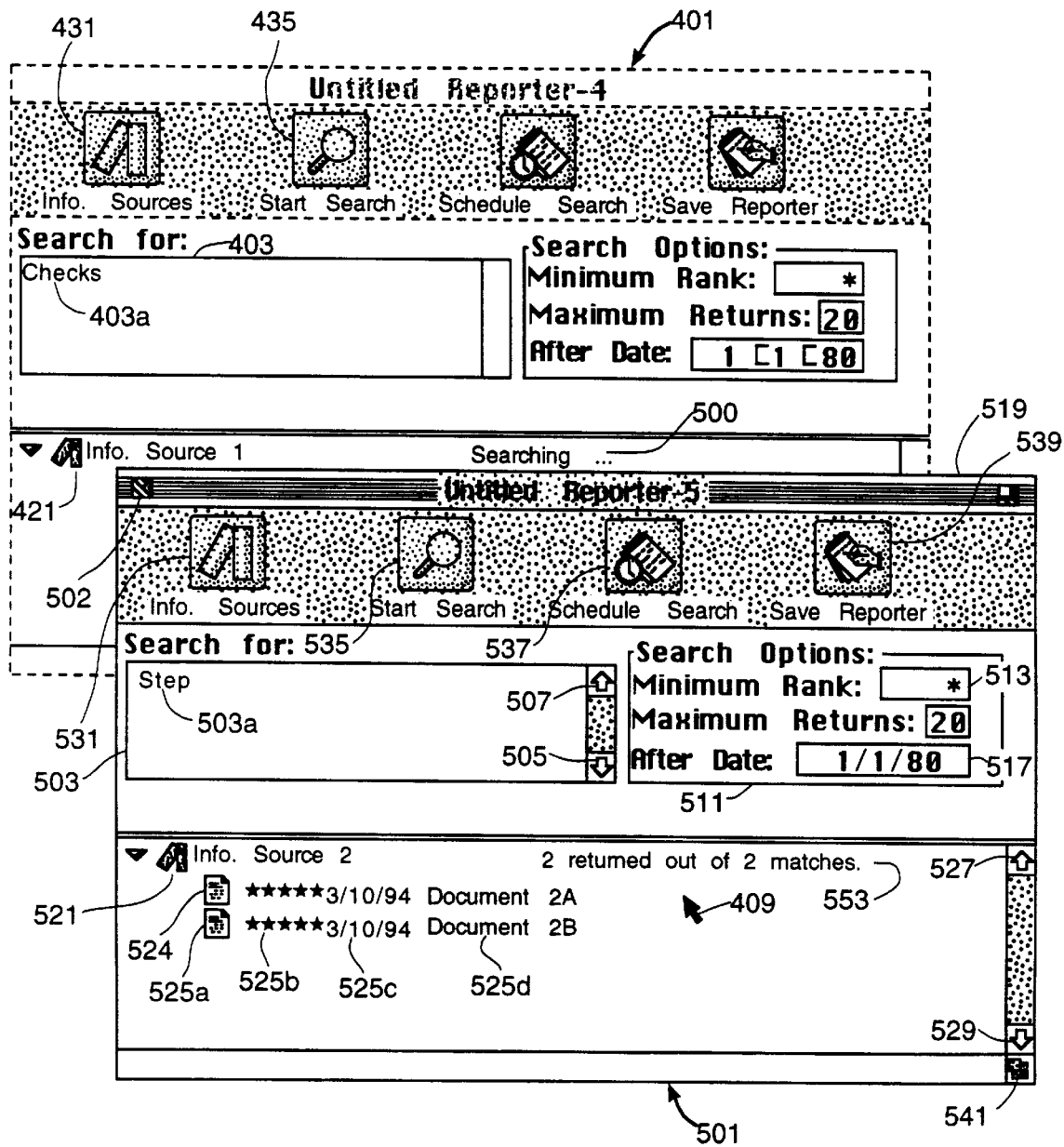
FIG_5

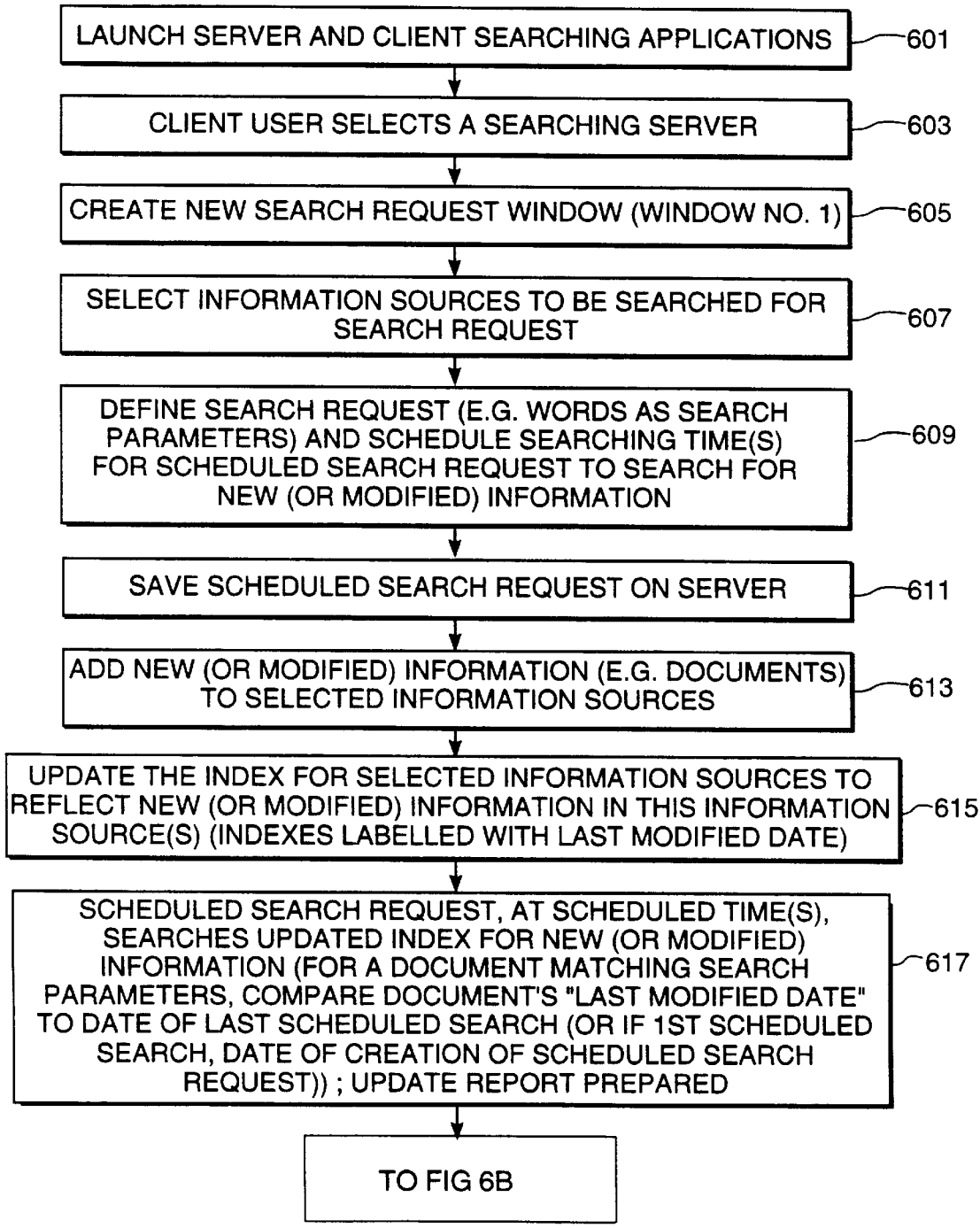
FIG_6A

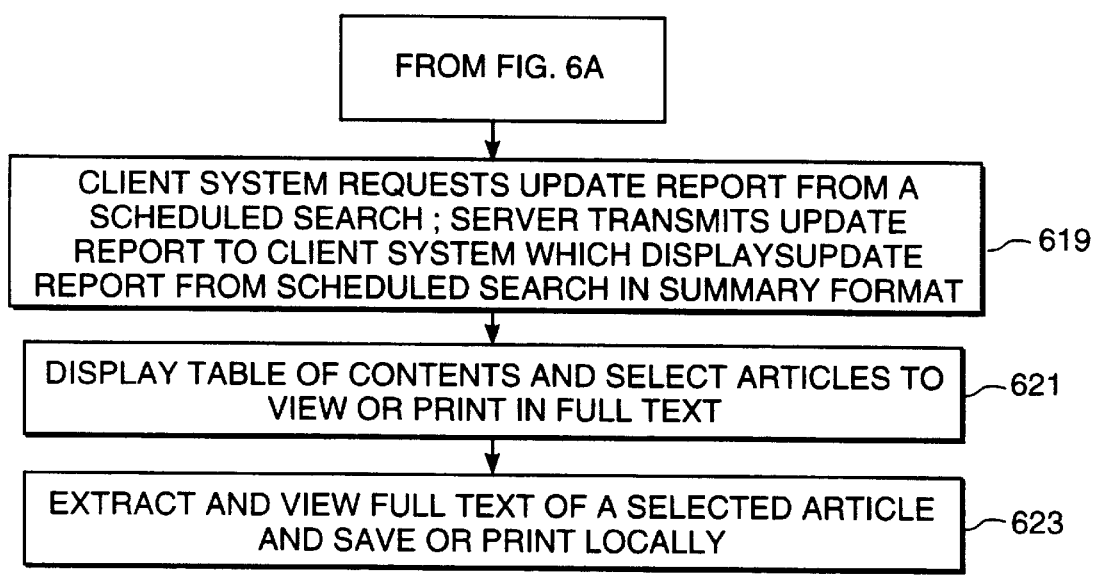
FIG_6B

Charles Dickens    4/27/93

Articles in Update: 24
Tuesday, April 27, 1993

Social Criticism in the Works

Monday, April 5, 1993
Source: Literature

Durbans Explanation
Oliver Twist, Fagan in Present

The output Oliver Twist, many of the characters after their relationship with security, such as when Oliver rises to a something economic status or fancy adapts a new code of morality. But the most fascinating internal swing occurs within Fagan, who until the very end the something demonstrators absolutely no introspection or underest on his relationship to security. He remain the essence of evil, until sitting in the cold, start, damp presen

The Boy Who Wanted More in

Saturday, April 3, 1993

Mrs. Perdiggle in the Bleak

Saturday, April 3, 1993
Source: Literature

Durbans Explanation
Bleak House Mrs. Perdiggle's visit to Term-

Mrs. Perdiggle, who accompanied Esther and Aida to the dressmaker's house, already established herself as utterly useless. The dressmaker's empoverished commonality has undetermined health care needs. Yet, Mrs. Perdiggle's donation consists of baby clothes -- for adult's who are unable to read. Esther is the only character who stops her useless charity and wrapped Esther's narrative provides reasons with a glimps of her worthiness developed in the London

Dickens & Little Dorrit

Monday, April 5, 1993

Charles Dickens

4/27/93

Articles in Update: 24
Tuesday, April 27, 1993

Social Criticism in the ...diggle in the Bleak

801

832

834

Monday, April 5, 1993
Source: Literature

Durbans Explanation
Oliver Twist, Fagan in Present

The output Oliver Twist, many of the
after their relationship with security,
Oliver rises to a something economi
adapts a new code of morality. But t
fascinating internal swing occurs wit
until the very end the something der
absolutely no introspection or unde
relationship to security. He remain t
of evil, until sitting in the cold, start,

Table of contents for
Charles Dickens: 4/27/93

Social criticism relationship with
security, such as when Oliver rises
to a something economic status or
fancy adapts a new code of
morality. But the most fascinating
internal swing occurs within
Fagan, who until the very end the
something demonstrators
absolutely no introspection or
underest on his relationship to
security. He remain the essence of
evil, until sitting in the cold, start,
da The dressmaker's
empoverished commonality has accompanied Esther and Aida
house, already established
less. The dressmaker's
onality has undetermined health
. Perdiggle's donation
hes -- for adult's who are
er is the only character
s charity and wrapped
vides reasons with a
ess developed in the London

Dickens & Little Dorrit

Monday, April 5, 1993

The Boy Who Wanted More in

Saturday, April 3, 1993

830

FIG__X

FIG. 10

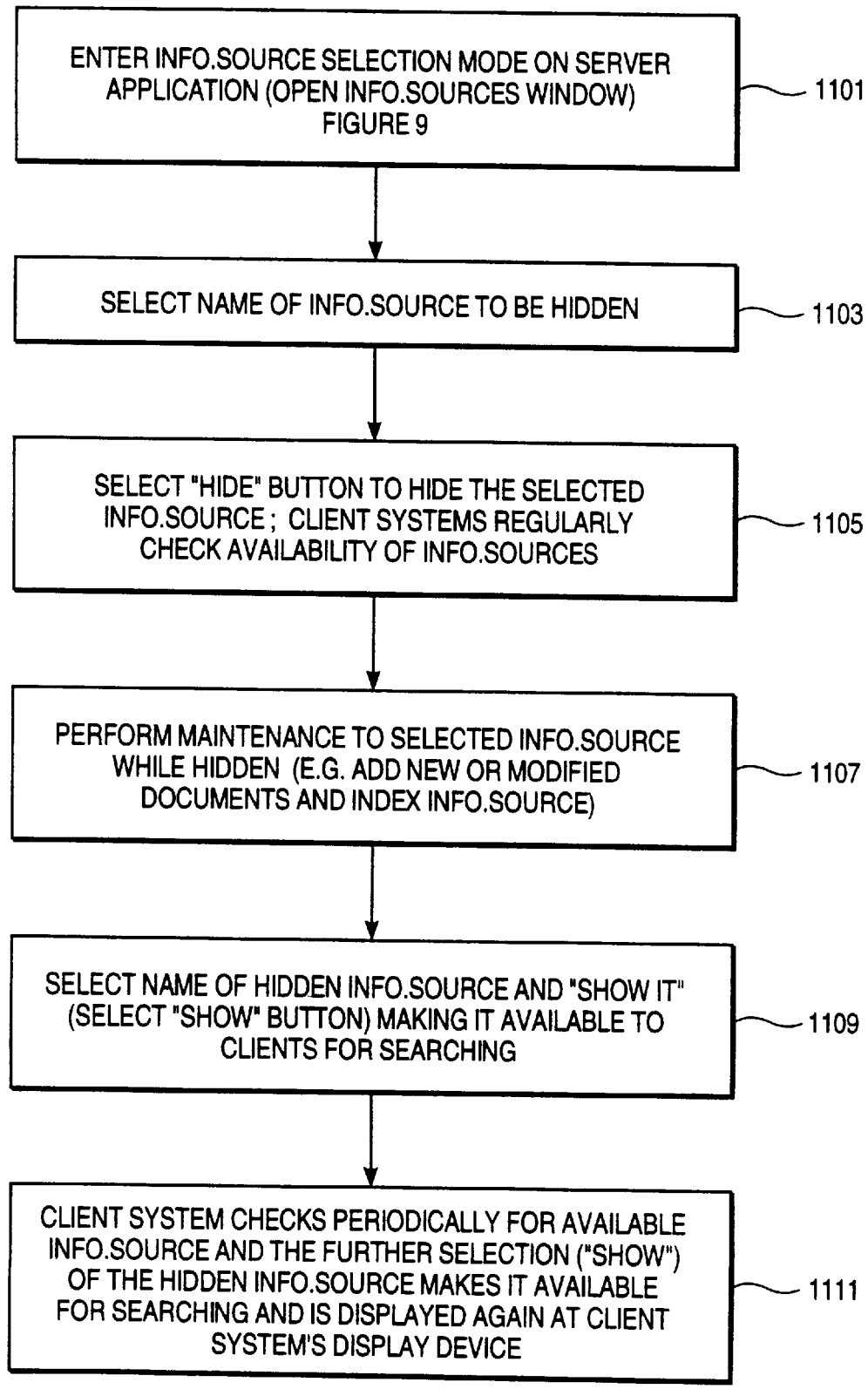
FIG_11

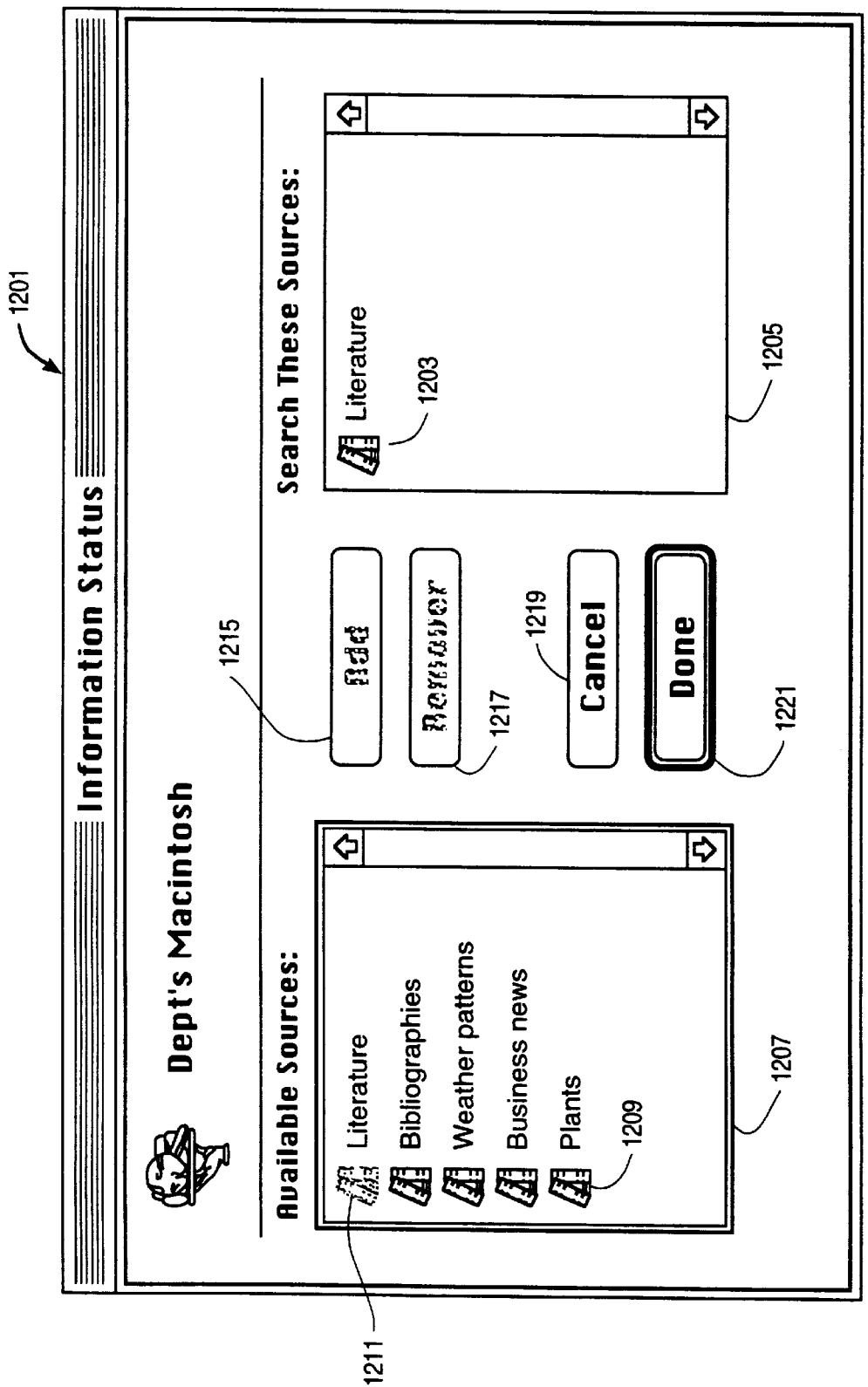
FIG_12

METHOD AND APPARATUS FOR SEARCHING FOR INFORMATION IN A DATA PROCESSING SYSTEM AND FOR PROVIDING SCHEDULED SEARCH REPORTS IN A SUMMARY FORMAT

This is a continuation of application Ser. No. 08/279,949, filed Jul. 25, 1994 now U.S. Pat. No. 5,715,443.

BACKGROUND OF THE INVENTION

The present invention relates to methods and systems for processing information in a data processing system. In particular, the invention relates to methods and apparatuses for searching for information stored in information storage devices coupled to at least one data processing system.

The process of searching through a large volume of documents which contain text in order to find a particular document or documents is often a very useful technique for obtaining information. Typically, the text of these documents is stored in electronic media in an information storage device (for example, magnetic media in a device such as a hard disk or an optical medium) which is coupled to a data processing system, such as a digital computer. It is often the case that an enormous volume of text is stored in electronic form in such a storage device. For example, a large number of U.S. patents are maintained in electronic form by various entities. Similarly, the full text of numerous periodicals, including newspapers, is often stored in information storage devices in the form of a database or other file, and users often want to search these databases or files to find articles, documents, etc. that are of interest to the user.

At times, the information being searched may reside locally on the computer system which is being used by the user; for example, text in electronic form from numerous sources such as articles from newspapers may be stored on a hard disk of the user's computer system and may be searched by commercially available full text searching software such as Gofer™, Sonar™, and ZYINDEX™. Unfortunately, the source of information may be so large that it cannot fit within a typical hard disk or other storage device of a typical personal computer. In this case, it is often necessary, due to the economics of computing resources, to spread the cost of large information storage devices among numerous users which are linked together by a computer network, such as a local area network. A well known example of a computerized network which includes information storage devices capable of storing large quantities of information is the Lexis/Nexis™ system run by Mead Data. In this case, it will be appreciated that this "network" is considerably larger than a normal local area network.

In prior art systems for searching for text information in a data processing system, the user may enter a single search request and then request either the local processor (e.g. the client workstation) or a remote processor (e.g. a server workstation) to execute the search request by performing a search through the information stored in an information storage device for documents which match the search request. While the search is being executed, it is not possible for the user to concurrently enter a further search request or to cause that further search request to be executed concurrently with the first search. Consequently, the user must wait after requesting execution of the first search request before entering a further search request and causing that further search request to be executed. While this is often acceptable in environments where all of the processing occurs on a local workstation (e.g. a personal computer), this situation is particularly inefficient in a network environment. In this environment, servers may be called upon by a number of different users from different client workstations to execute different tasks or perform other tasks such as preparation of new documents (e.g. indexing existing documents), and thus a server would not be available to process a search request. Consequently a client user would be prohibited from even entering a second search request until the server has had an opportunity to execute the first search request after handling other prior tasks from other users in a network. Wide area networks (with interconnected local area networks) pose an even greater problem in the sense that the gateways and routers interconnecting local area networks may be busy with other transactions, and thus a user and his/her machine may be prevented from any other searching activities while a first search request is being processed through a first search.

In many information sources, such as databases, there is often a need to add new documents which have come into existence after the creation of the database or modified documents which have been modified since the creation of the database or information source. For example, a textual database containing articles from newspapers will need to be periodically updated with subsequently released newspapers in order to keep the database current with the current contents of the newspaper. Similarly, if the information source is a collection of U.S. patents, then the information source will need to be updated with U.S. patents which issued subsequent to the last date on which the database was modified to include newly issued U.S. patents. In prior art systems, a user would normally define a search request at one point in time and then have to repeat that search request at a later time by manually entering the search again in order to see if any new documents which have been added to the database exist since the last search. In such prior art systems the manual entry of a subsequent search request (or retrieval of a saved search request to be executed again) will result in the generation of a report which is a listing of documents found in the search, where the format of the report is identical to the format used in responding to a normal search request. Even systems which execute automatic future searches (e.g. the "Eclipse" feature in Lexis) do not generate specially formatted reports. That is, the response of the data processing system to a subsequent search request will be identical in format to the response from the search request when previously executed. No special effort is taken to display the information to the user in a manner which is helpful in evaluating updated information available from the information source since a prior search. Indeed, in many systems, the report of a subsequent search report will include the results of a prior search report and thus there can be considerable duplication between an original report from a first search and a subsequent report in a subsequent search.

In these prior art systems which utilize information sources which change over time, it is often necessary to perform "maintenance" on the information source. This maintenance typically includes adding additional documents or removing documents as well as indexing new documents or compressing/compacting indexes which have been changed due to the removal of documents from the database. This "maintenance" is typically performed in a network of computer systems where one computer system, referred to as a server workstation or computer system typically controls access to information sources by other computer systems in the network such as those systems referred to as "client" computer systems. In these environments, a user at a client workstation is often presented with a list of available information sources even though a particular information source in unavailable or Is undergoing maintenance by the operator of the server workstation. In this circumstance, the results of any search performed may be erroneous; for example, the user of the client system may believe that in fact he/she is searching an information source when in fact it is not available.

From the foregoing discussion, it can be seen that it is desirable to allow a user of a computer system to be able to execute further searches after requesting a first search, particularly in a network environment. It is also desirable to present to the user data, in a summary format, showing a report of a scheduled search, particularly one which has been scheduled to occur automatically by the user, in order to improve the user's efficiency in evaluating the search results from a scheduled search. It is also desirable to allow a user on a client computer system in a network to obtain accurate information about the availability of information sources while also allowing the operator of a server computer system to maintain the information sources and also provide accurate information to users of client systems about the availability of information sources.

SUMMARY OF THE INVENTION

A method for processing information by searching for information in a data processing system which is coupled to an information storage device having information stored therein is described. In one embodiment, a user on a first processor defines a first search request, where the first search request typically includes at least one parameter which specifies a desired type of information. Then, a search of at least a portion of the information stored in the information storage device is performed using the search request defined previously to determine whether the type of desired information is stored in the information storage device. While performing the first search the first processor executes another searching process associated with the information. This other process typically comprises defining a second search request of information where this search request includes parameters which specify a second type of desired information. In one embodiment, involving a network of computer systems, a first processor receives the first search request from the second processor and executes that search request by performing the search of at least a portion of the information stored in the information storage device. Typically, the method further includes displaying a first search report showing a first result of performing the first search and also displaying a second search report showing a result of performing the second search if a second search has been requested.

According to one embodiment of the apparatus of the present invention, the information is stored on at least one information storage device which is coupled to a first processor. A first input device may be coupled directly to the first processor or through a network, and the first input device is used to define a first search request which includes at least one parameter which specifies a type of desired information. A memory, such as random access memory (RAM), is typically coupled to the first processor, and this memory stores the first search request. The first processor typically uses this first search request to perform the first search of at least a portion of the information to determine whether the type of desired information is stored in the information storage device.

According to another embodiment of the present invention, a method is disclosed for searching information in a data processing system which includes information storage device having information stored therein and which provides for the generation of a report in summary format for a scheduled search. In this method a first search request is defined. Then, in one embodiment, the first search request is executed when new documents are added to an information source (e.g. new documents are added, or in systems which require indexing before searching, when new documents are indexed) or whenever the server workstation determines that there are new documents which are available for searching; the execution of this search request produces a report which is saved and is used at a scheduled time to generate a report in summary format. In an alternative embodiment, the performance of this search request is scheduled such that the first search using this first search request occurs at least at one future time such as a first scheduled time. When this first scheduled time occurs, the first search using the first search request is performed, and a first report in summary format is generated; this first report shows the result of performing the first search at the first scheduled time. The user may after generation of a first report cause it to be displayed in its summary format on a display device.

This summary format may include at least one (and often several) of a number of different items for each document shown in the report in summary format. These items may include, for each document shown in the report: at least a portion of the document's title; at least a portion of the document's file name (in some systems the title and file name may be the same); at least a portion of the first paragraph of the document; at least a portion of the second paragraph of the document; the name of the directory (or information source) containing the document; the date the document was added to the directory (or information source) containing the document; a date the document was last modified; and, in some embodiments, the author of the document. The summary format may also include data showing how many documents were found in the search performed at the first schedule time and the date and time at which the search was performed. In addition, the summary format may include a listing which resembles a table of contents where each document found in the scheduled search is listed in the listing. The table on contents provides a quick way for a user to select a particular document in the summary format by selecting the documents title or file name from the listing.

An apparatus for searching information in a data processing system which can provide scheduled searches and generate reports in summary format from those scheduled searches is also described. This apparatus typically includes an information storage device having information stored in the device, and a first processor coupled to the information storage device. An input device, such as a keyboard, mouse, trackball (or other well known computer input devices) is coupled to the processor. The input device is used to define a first search request which includes at least one parameter which specifies a first type of desired information. The input device is also used to define scheduling data for scheduling retrieval of search results in a report, or in an alternative embodiment performance of the first search, at a first scheduled time. The apparatus further includes a memory coupled to the processor where the memory stores the first search request and the processor uses the first search request to perform when necessary (e.g. new documents have been indexed), or at the scheduled search time, a search of at least a portion of the information to determine whether the first type of desired information is stored in the storage device. The processor, after performing the first search generates a report in summary format, which report shows the results of performing the first search. In one embodiment of the invention, the apparatus includes a first processor and a second processor which are coupled together over a network such that the first search request is sent over the network from the second processor to the first processor and the first processor performs the search as necessary, or in an alternative embodiment at the first scheduled time, and the second processor generates the first report which may be later retrieved by a user of the second processor. In the embodiment where the search is performed as necessary, the server workstation executes the first search request when new documents are added to the information source and indexed (if indexing is required) to determine if the new documents match the client workstation's search request. The server workstation stores a list of such new documents which match the search request, and at the scheduled time, the client workstation retrieves this list and generates the report in summary format.

BRIEF DESCRIPTION OF THE DRAWINGS

FIG. 1 depicts an embodiment of data processing systems according to the present invention in a network of data processing systems.

FIG. 2 shows in block diagram form information which is stored within the memory of a server computer system.

FIGS. 3a and 3b depict an example embodiment of a method of the present invention which involves concurrent searches initiated from the same processor.

FIG. 5 shows two search request windows where concurrent search processes are being performed at the request of a user on one processor.

FIG. 6A and FIG. 6B show a flow chart describing a typical embodiment of the method for scheduling searches and generating reports of those scheduled searches in a summary format.

FIG. 7a shows a typical embodiment of a report in summary report generated from a scheduled search.

FIG. 8 shows a further embodiment of the summary format of a report generated from a scheduled search, which summary format includes a table of contents listing.

FIG. 10 shows a typical search status window which may be displayed on a display device of a server computer system in the network of the present invention.

FIG. 11 shows a typical method of the present invention for performing maintenance on information sources and for controlling the display of available information sources on client computer systems in the network according to the present invention.

FIG. 12 shows a typical information sources window which may be displayed on a client computer system in the network of the present invention.

DETAILED DESCRIPTION OF THE PRESENT INVENTION

Figure 4A:
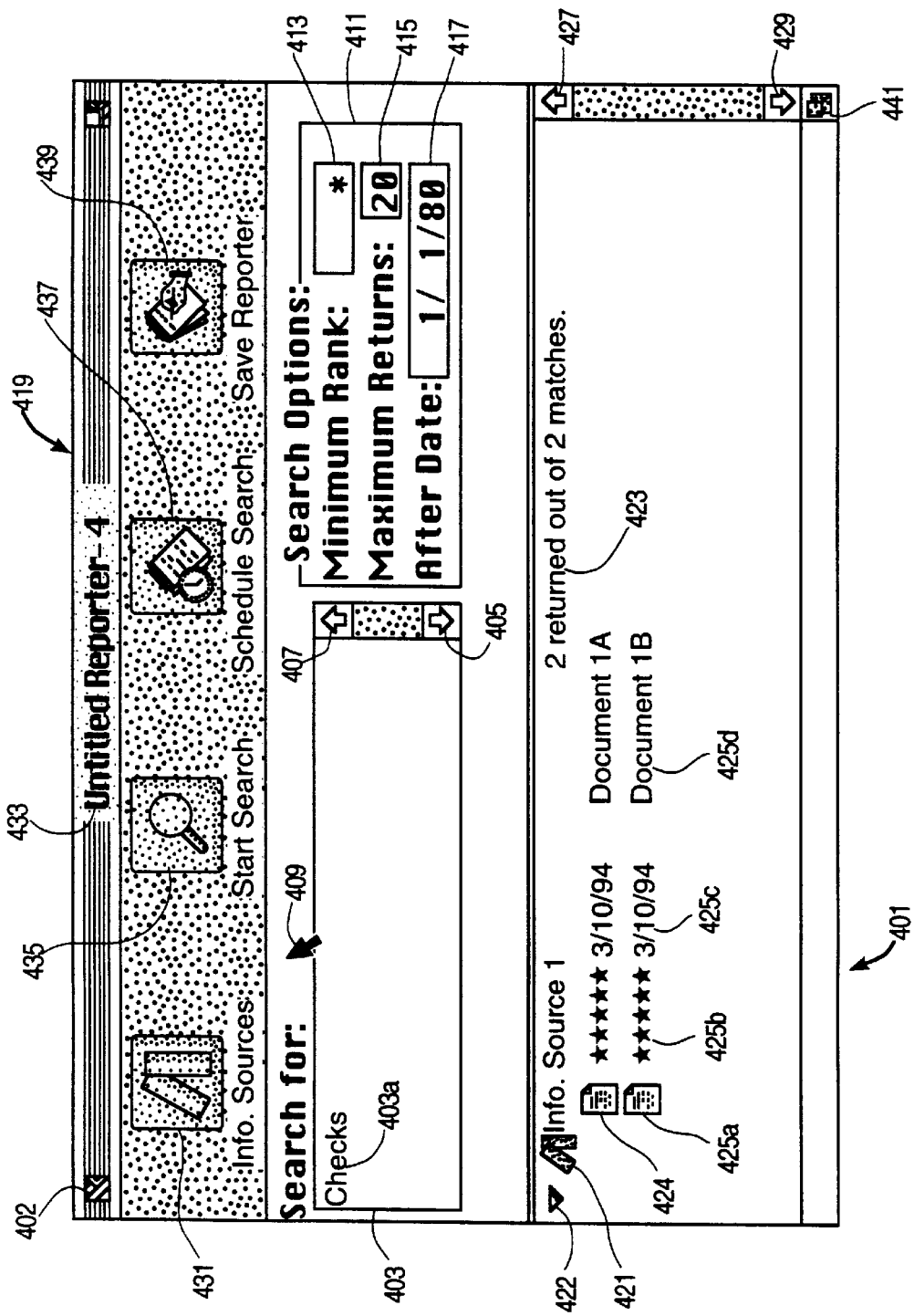
FIG. 4a shows a typical search request window which may be used for defining search requests and specifying other search options.

In the following description for purposes of explanation, specific systems, interconnections, and processing steps are set forth in order to provide a thorough understanding of the present invention. However, it will be appreciated by one skilled in the art that the present invention may be practiced without the specific details disclosed herein. In other instances, well known systems are shown in diagrammatic or block diagram form in order not to obscure the present invention unnecessarily.

The present description includes material protected by copyrights, such as illustrations of graphical user interface images which the assignee of the present invention owns. The assignee hereby reserves its rights, including copyright, in these materials, and each such material should be regarded as bearing the following notice: Copyright Apple Computer, Inc., 1993. The copyright owner has no objection to the facsimile reproduction by anyone of the patent document or the patent disclosure, as it appears in the Patent and Trademark Office file or records, but otherwise reserves all copyrights whatsoever.

Referring now to FIG. 1, various aspects of embodiments of the present invention may be performed in a network of data processing systems, and FIG. 1 shows an example of such a network. In particular, FIG. 1 shows two local area networks interconnected by a gateway 61 which is typically a computer system configured to operate as an interface between local area networks and often includes a modem for communicating over telephone systems. One local area network (LAN) includes a server computer system 9 and two client computer systems 33 and 57 as well as an information server 55. The network coupler 31 is typically a network bus comprised of wires or fiber optic cable or maybe a wireless network which uses radio communication transmitters and receivers. The network may operate pursuant to any number of networking standards including well known standards such as Local Talk™ EtherNet, Token Ring, AppleTalk Remote Access™ (ARA) as well as other well known networking standards. A second local area network (LAN2) 65 typically comprises a plurality of computer systems (which may be referred to as workstations) where some computer systems may be server computer systems and other computer systems may be client computer systems. It will be appreciated that computer systems in the second local area network 65 may communicate via the gateway 61 with other computer systems in the first local area network, such as the server computer system 9. It will also be appreciated that the gateway 61 may be eliminated, and the server 9 may perform the functions of a gateway system between the two local area networks. Also shown is an Internet server 63 which may store information (e.g. on computer "bulletin boards") which may be retrieved by a computer system in either of the local area networks. It will be appreciated that Internet server 63 is part of the well known system of interconnected computers known as "Internet."

The server computer system 9 includes a processor 10 and a memory 11 which are interconnected by a system bus 12. A display controller 14 and a display device 15 are coupled to the processor 10 through the system bus 12. A mass memory 17, which may be a local hard disk which stores information in magnetic media or optical media, is coupled to processor 10 and the memory 11 through the system bus 12. Typically, a computer system includes input and output devices in addition to a display device. For example, an output device may be a hard copy printer. Numerous input devices are also well known such as keyboards, mice, trackballs, touchpads, and styluses (pens) and these input devices communicate with processor 10 and memory 11 via a controller such as the I/O controller 21. The server computer system 9 is linked to the other computer systems in the network by a network interface 25 which is coupled to the system bus 12 by a local bus 19 and the server 9 is linked to other remote servers (e.g. Internet server 63) in conventional ways (e.g. through gateway 61) or, as noted, the server 9 may itself perform the functions of a gateway system.

Client computer system 33 contains similar components which are interconnected in a similar manner. For example, client computer system 33 includes the processor 37 and a memory 39 which are interconnected by a system bus 41. Client computer system 33 also includes a network interface 35 which couples the processor and other components within the computer system 33 to other computer systems in the network. Client computer system 33 also includes a display device 47, which may be a CRT or a liquid crystal display or a plasma display or other well known display devices used in computer systems. As with server system 9, the client system 33 includes input devices such as input device 51 which may include at least one of a keyboard, mouse, trackball, touchpad, and a pen input device as well as other well known computer input devices. As with server system 9, the display controller 45 couples the display 47 to other components within the computer 33, and the I/O controller 49 couples the input/output device 51 to other components, such as the processor 37 of client computer system 33. It will be appreciated that the client computer system 57 is typically similar to the client computer 33 and that server computer system 55 is typically similar to the server computer system 9. It will be appreciated that other network resources which are coupled to either local area network of FIG. 1 may include printers, modems, memory, disk devices, etc. as is well known in the art. See, for example, U.S. Pat. No. 5,150,464.

Prior to describing various aspects of the present invention in detail, a general overview of various aspects will be provided with reference to FIG. 1. In a typical embodiment, text documents (which may include other information such as graphics) are stored on the mass memory device 17 of the server computer system 9. Users of client computer systems, such as computer system 33 may search through those text documents, such as newspaper articles or articles from scientific engineering periodicals. The searching process typically involves the user of a client computer system specifying certain words which the user believes should be in documents which the user desires to see. The user of the computer will often type into a keyboard these words which are used to define a search request. Then the user requests that the search be performed by typically selecting an option representing a start search command which is displayed on the display device 47. At this point, the processor 37 sends this first search request over the network through network interface 35 and network interface 25 to processor 10 which executes the search requests by performing a first search through the documents stored in mass memory 17.

It will also be appreciated that the Internet server 63 is similar to the server system 9 and that data from the server 63 (e.g. data stored in information storage devices coupled to the server 63) may be obtained by the server system 9 using known networking techniques. Thus, data stored on storage devices coupled to the server 63 may be searched through by searching software on server 63 which is similar to the software on server 9 and which receives search requests from server 9 and executes the search requests by searching the data and responds to the server 9 with the results of the search requests. The server 9 combines the results of such remote searches with the results of the searching the server 9 performs on data stored in local storage devices (e.g. mass memory 17) coupled to the server 9. The combined search results are displayed to a user of a client system (e.g. system 33) within one window. While the first search is performed through the information sources stored in mass memory 17 or elsewhere such as the information sources associated with the Internet server 63, the processor 37 in the client system 33 may receive further search requests from the user of the client system 33 such as a second search request which seeks different types of documents.

For example, the first request by the user of client system 33 may be directed to data concerning financial information about a particular company which data the user believes will be located in the information sources stored in one of the memory devices coupled to the network. For this search, the user may use words such as the company's name, "balance sheet" and "cash flow" together with well known Boolean logic operators in order to specify search parameters which specify the desired type of information concerning financial information about the company. While the processor 10 in the server system 9 is executing the first search for this financial information, the user of this client system 33 may define a second search request or perform some other search related operation such as selecting other information sources to search through or scheduling a search to be performed in the future at some scheduled time. The second search request may typically comprise a different collection of words which represent parameters which specify a second type of desired information such as policy statements of a particular politician concerning a particular economic/business issue. After defining this second search request, the user of the client system 33 may instruct the data processing system to perform this search, which will be a second search while the first search is still being performed.

It will be appreciated that the present invention has particular utility in a network environment where certain searchable information sources may be temporally inaccessible through the network due to use by other computer users. Due to the unavailability of these information sources, the client system 33 would be prevented from performing any other search related operation if the results of the first search needed to be completed before other searching operations could be performed from system 33. Thus, for example, if information server 55 or some other network resource was temporarily occupied with performing another operation or servicing some requests from other than the user of client system 33, any searches of searchable information sources on information server 55 would have to wait until information server 55 was again available for searching; according to the present invention, rather than waiting for the search result to be completed from this first search which is stalled due to the unavailability of the information server 55, the present invention allows the user of client computer system 33 to perform a further search which may involve different information sources which are not stored on the information server 55 and thus obtain results from that second search request while the first search request may still be pending. In this manner, the present invention improves the efficiency of data processing systems which allow for searching of information, particularly in a network environment.

According to another aspect of the present invention, the user of client system 33 may define a first search request and the client 33 instructs the server 9 to perform that search request in the future every time after new or modified documents are added to the information sources which are available for searching. In an alternative embodiment, the user of the client system 33 may define the first search request and schedule the performance of that search request in a first search at some first scheduled time in the future. In either case, the search occurs at a deferred time. Typically, the user of client system 33 will type into an input device such as a keyboard the words defining a future search, and the processor 37 will communicate this search request along with the scheduled time to the processor 10 which will store the search request as well as the scheduled time. Typically, the scheduled time is a plurality of scheduled times causing the processor 10 to periodically report the results of searches for new and modified documents which have been made available in the various information storage devices, such as the mass memory 17 in the server 9. That is, this scheduled search is designed to find only new documents or modified documents which have been added to the information sources stored in the information storage devices of the network since the search was defined (in the case of a first scheduled search) or since the last scheduled search was performed. In this manner, the user will be able to display on the display device 47 any new documents since a last search in order to keep up on current developments on those issues of concern to the user. It is noted that a "new" document includes a document which previously existed in the information sources prior to a scheduled search but which has been modified to contain new content or modified content. The user is presented with a report showing the results of each scheduled search, where this report is in a different format than the format generated from a search which is not a scheduled search; that is, the format from a scheduled search is a summary format providing summary information which may include a table of contents as well as other items, and this format differs from the normal reports prepared for searches which are executed on a non-scheduled basis (e.g. immediately after defining a search request).

According to another aspect of the present invention, the operator of the server computer system 9 must perform maintenance on the information which is searchable in the information sources stored in the information storage devices coupled to the network, such as mass memory 17. This maintenance may include adding new documents not previously stored in the information sources as well as removing documents which are desired to be removed and other well known maintenance operations. The user of the server system 9 may select certain information sources for maintenance and by doing so cause, at some point in time after selection for maintenance, the information source to no longer be displayed at a display device of a client system, such as client system 33.

FIG. 2 illustrates data structures and computer programs which are used with the various searching operations performed according to the present invention. Memory 11, as shown in FIG. 2, includes data 201 which specifies a first search request including search parameters and scheduled search times. Another search data 203 may specify a second search request which includes parameters for searching pursuant to the second search in request. Memory 11 will typically also include at least pointers 205 to searchable information such as information sources. These pointers are typically addresses to the mass memory 17 or other addresses for other information storage devices coupled to the network, where these pointers and addresses are provided in the well known manner of the prior art. Memory 11 further includes software, such as software 207 for searching through textual documents. This software will typically be capable of searching through the full text of a textual document and may, according to one embodiment, include indexing software for indexing the words in a document to create an indexed list of words in the well known manner of the prior art. It will also be appreciated that the operation of the search engine in conjunction with performing a single search from a single search request is well known in the prior art. The memory 11 further includes request and reply control software and windowing interface software which may be implemented using conventional techniques. This software, as well as the search and indexing software 207, is typically executed by processor 10. It will be also appreciated that processor 37 as well as other processors in other clients systems will contain similar request and reply control software for allowing users to define search requests and for providing reports of the results of the searches back to the user at a client system by displaying the report on a display device or allowing the user to print reports and/or individual documents listed in the reports. In addition, memory 11 will typically include updated search reports 211 which are generated as a result of performing scheduled searches at scheduled times according to one embodiment of the present invention. These updated search reports will be accessed by client systems through the network in order to display in summary format the results of a scheduled search.

One aspect of the present invention will now be described with reference to FIGS. 3a, 3b, 4a, 4b and FIG. 5.

Figure 4B:
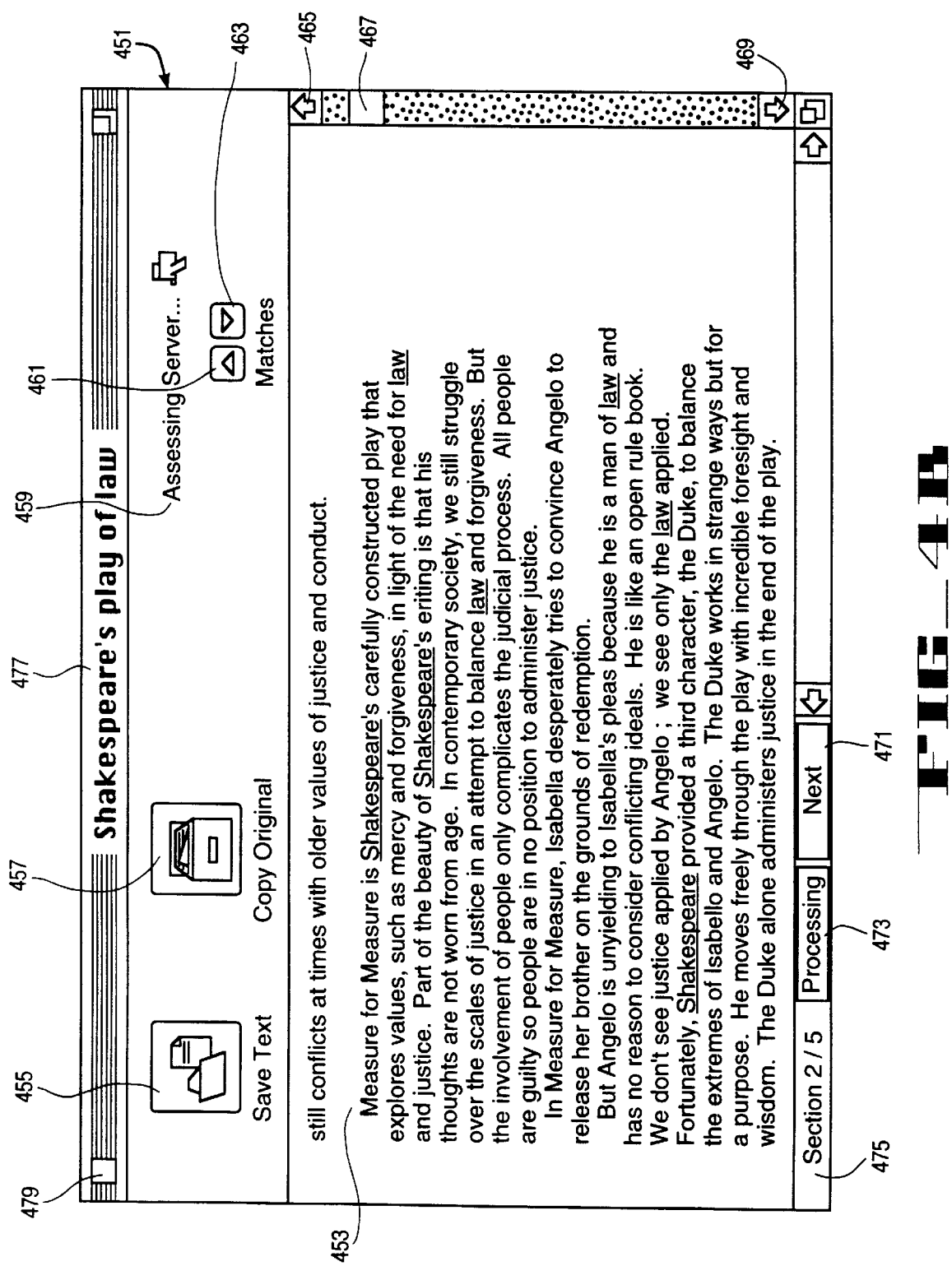
FIG. 4b shows a typical example of a document display window showing the text of a document found in a search of an information source.

FIGS. 3a and 3b illustrate a typical process according to the present invention while FIGS. 4a, 4b, and 5 illustrate typical user interface screens which result at various points from the searching process. The process beings in step 301 in which the user of the server computer 9 starts the server searching software to run on processor 10 and the user of a client computer system, such as client system 33 starts the client's searching software to run on processor 37. In step 303, the user of the client system selects a particular server which should be running the server search software on the server processor. In the example of FIG. 1, the user of the client system 33 would select the server 9 which includes the processor 10. In step 305 the user on the client system 33 creates a new search "agent" within a window 401 shown in FIG. 4a. The presentation of the user interface of window 401 may be implemented by well known programming techniques. Window 401 may be referred to as a search request window for a first search request specified in box 403 by parameters 403a. It will be appreciated that these parameters typically include words which the user expects to find in documents which the user desires to retrieve. These parameters may also include Boolean operators and other special purpose characters (e.g. "Wildcard" characters) to interconnect the various words; it will be appreciated that this process of defining search requests is well known in the art. In step 307, the user may create a second search agent (search request window) such as window 501 shown in FIG. 5. Both search window 1 and search window 2 may exist concurrently and may be reporting results of or the status of searching operations for two different search requests also concurrently.

In step 309, the user of the client system 33 may select at least one information source for the first search request defined by parameters 403a. In one embodiment, the user may position a cursor 409 over the icon 431 to cause the client system 33 to communicate with the server system 9 in order to determine the available information sources in the network, which are available for searching currently. In other embodiment, the user may select the icon 431 to select available information sources and the client system 33 retrieves the list of such sources from a local storage device (e.g. memory 39 or memory 43) which contains a list of the available information sources in the network (which may include externally remote sources such as those stored on Internet server 63). In this embodiment, this locally stored list is "cached" on a local storage device of client system 33 in order to avoid retrieval, through the network, of a list from the server 9 each time icon 431 is selected and the cache list may be created upon initialization of the search software on client system 33 and may be regularly updated. In response to selecting the icon 431, which represents a command for retrieving an information sources window, the client system 33 displays an information sources window to the client user, such as the window shown in FIG. 12. Within the window, the user may select various information sources which may be categorized according to subject matter/topic in order to speed searching. This is shown in FIG. 12. After selecting the appropriate information sources in step 309 the selected information sources for the first search request initiated by search window 401 will be available for searching and after searching they will be displayed within the lower portion of the window 401. For example, an icon 421 for an information source having a name "Info.Source 1" is displayed within the region along with status information 423 showing the number of matches after a search. For example, this status information 423 may show the number of documents which match the request in the information source. In addition, the search window 401 displays an icon representing each document, such as icons 424 and 425*a*. Associated with each document icon is a relevance ranking such as relevance ranking 425*b*, a date 425*c* and the title of the document 425*d*, which is typically the file name of the document (although usually not the full path name of the document). The individual listings of the documents found in the search may be obtained in one embodiment by selecting the icon 421 or by selecting the arrow icon 422. The selection of these icons which are displayed on the display device may include any user interface selection technique, including positioning the cursor 409 over the particular icon and selecting the icon by changing the state of the switch (e.g. pressing a button on a mouse). If more documents exist than can be displayed within the space in the lower portion of window 401 then these documents may be brought into view by using the well known scrolling arrows 427 and 429 on the side of window 401. Alternatively, the size of the window 401 may be changed (enlarged or shrunken) by selecting icon 441 in order to change the size of the window; an example of this process can be found in the Macintosh window user interface produced by the Finder™ computer program.

In step 311, the first search request is specified and may include the selection of search options within box 411 of window 401. For example, the user can specify a cut-off date prior to which no documents are to be retrieved; that is, the search engine will retrieve only those documents having a date of creation or last modification after the date entered in box 417. The user can also specify in box 415 the maximum number of returns that the search software is to retrieve and present to the user. This is provided in order to allow the user to view and select the most relevant articles as the searching software ranks the retrieved documents by relevance according to well known document vectors which include parameters such as the number of times a particular desired word (which was included in the search parameters) is used in the document, along with other well known relevance ranking factors. In the example shown in FIG. 4*a*, the user has limited the number of returns to 20 such that if 50 matches to the request are found only the 20 most relevant articles will be displayed to the user. The user can also, by setting a parameter within edit box 413 set a minimum ranking which is required in order for the software to retrieve and display a particular document. That is, if the user sets a higher ranking than one star as shown in FIG. 4*a* then only those documents meeting that minimum ranking, in terms of relevance ranking, will be retrieved by the search software for display to the user within the lower portion of search window 401. It will be appreciated that ranking is performed usually while searching, not after searching, and that ranking while searching is performed using conventional searching techniques.

In step 313 the user requests that the first search request be started in order to start a first search. It will be appreciated that prior to starting the search and prior to receiving the results of the search that icons 424 and 425*a* and the associated information will not be displayed as the search results have not been obtained yet. That is, the window of FIG. 4*a* shows a search after it has been completed. The user may begin the search by selecting the start search icon 435 or by other command input techniques which are well known in the computer art, such as using a sequence of keystrokes or a graphical user interface technique, such as pull down menu. Then in step 315 the process performs the first search by searching through the indexes associated with information source 1 represented by icon 421. The searching through the index associated with Info.Source 1 is conventional, and the searching process will normally keep track of the current position in the index in order to keep track of what has been searched through in the index and what is yet to be searched through. This information will be used to resume a first search task in case of a suspension of the first search task because of multithread processing of another concurrent search request (if multithread processing is used) which is causing another search task.

In step 317, the user selects the same or another group of information sources for the second search request which will be entered through the second search request window 501 shown in FIG. 5. In the same manner as with window 401, the user may select the same or a different group of information sources by selecting the icon 531 for information sources which will cause an information sources window such as that shown in FIG. 12 to appear on a display device of the user's computer system. The user can then select the appropriate information sources using any of the well known user interface techniques such as pointing to the name of the information source with a cursor positioning device, such as a mouse, trackball, touchpad, or pen/stylus and causing the selection to occur (e.g. changing the state of a switch such as a mouse's button). In step 319 the user specifies a second search request and then starts processing the second search request by starting the second search in step 321. This is typically accomplished by selecting the start search icon 535 by, for example, positioning the cursor 409 over the icon 535 and selecting the icon.

In step 323, the second search request is processed by performing a second search in which the index which is associated with the information sources selected for searching in the second search request are searched for matches to the search parameter specified by the second search request, such as the search parameter 503*a*. In one embodiment, the second search request is performed after performing the first search request but the user of the client system 33 may while the first search request is being performed (and not yet completed) define and start a second search request. The server system 9 receives each search request and prioritizes them in a list according to time of receipt from a particular client user, where each client user is serviced on a round robin basis. In other words, if client system user 1 starts two search requests "S1" and "S2" (where S1 is started before S2) and a client system user 2 (on another client computer system such as system 57) starts two search requests "S21" and "S22" (where S21 is started before S2 and S22 but after S1) then server 9 performs these searches in the order: S1, S21, S2, and S22. Thus, each client system sends off its search requests and waits for a response from the server system, and while waiting, the user of such a client system may start (send off) another search request without having to wait for the results on a prior search request. In one embodiment, a client system may send off to the server system a search request for each separately designated information source designated to be searched within a search request window, and these search requests are processed separately in a round robin priority mechanism. The server may also prioritize other processing tasks associated with the information such as text retrieval and listing information sources and these tasks are typically given a higher priority relative to the task of executing search requests because the execution of search requests is relatively time-consuming.

An alternative embodiment may employ multithread processing where each search request is processed as a processing task with task identifiers. In this embodiment, as with step 315, the search process for search 1 is performed as a thread of processing (a first processing task) and the search processing for the second search is performed as another processing thread (for another processing task) using well known multithreaded processing techniques in the computer art. In this manner, both search process 1 for the first search and search process 2 for the second search are performed in a multitasking way and if the first search remains pending because of the inability to access a particular networked information storage device which is currently servicing another request in the network then search process 2 for the second search can proceed and provide results back to user as shown in FIG. 5. It will be appreciated that FIG. 5 shows the alternative embodiment which uses multithread processing and that, if the first embodiment is used, then the window 401 will show the status of the first search as "searching . . . " or show the results of a completed first search while the window 501 will show the status of the second search as "searching."

In step 325, the process retrieves the file names of documents which match the first search request and displays the results in the search window 401 as shown in FIG. 4a. In one embodiment, ranking is performed by the server 9 and display is performed by the client 33 on display device 47. In step 327, the system retrieves the file names of documents matching the second search request and displays them in the search request window for the second search, such as window 501. Again, the server 9 in one embodiment ranks the documents during searching and thereafter the client 33 displays the results. It is noted that the first search request entered into search window 401 is shown completed in FIG. 4a whereas in FIG. 5 this search request is still pending while the results for the second search are displayed to the user indicating that the second search has been completed. That is, FIGS. 4a and 5 show alternative sequences of operation, wherein, in the case of FIG. 4a, the second search was not entered and the search results came back prior to entry of the second search request; in FIG. 5 (which uses the alternative embodiment of multithread processing), the second search request was entered and executed and the results of the second search were reported to the user on a display device while the first search was still pending. The flowcharts of FIGS. 3a and 3b depict one particular sequence of operations, and it is clear that numerous other sequences are possible such as those sequences represented by FIGS. 4a and 5 (e.g. steps 325, 327, 329 and 331 may be in a different order, and steps 307, 309, 311, 313, 315, 317, 319 and 321 may be in a different order).

In step 329, the user views the search results in window 401 and selects articles for viewing. Thus, as shown in FIG. 4a the user would view the search results and may select an article for viewing (of the article's full text) by selecting, using well known user interface techniques, one of the documents. For example, the user may select Document 1B by selecting the icon 425a in window 401. This will cause a processor, such as processor 10 in the server system to extract the text from the original document and translate the text if necessary using well known software translators in order for the text to be displayed on the display device 47 of the client system 33.

FIG. 4b shows an example of a document viewing window after a document has been selected from the search window 401 or another search window such as search window 501. The text of the document is displayed within region 453 and the user may see portions of the text which are not displayed by using the scrolling arrows 465 and 469 or the scrolling bar 467 using well known graphical user interface techniques. The user may also close the document viewing window 451 by selecting the close box icon 479. The user has several other options in connection with the document viewing window 451 including saving the text of the document on a local mass memory device 43 of the client system 33 by selecting the icon 455. Alternatively, the user may copy of the original document in its original format, which may include non-text material such graphics, by selecting icon 457. The user can also move from match to match by selecting icons 461 and 463. This allows the user to find matches above or below the current insertion point (usually indicated by the position of the vertical bar cursor) or a selection which may or may not be a selected match. In the example of FIG. 4b, the users search request was the phrase "the law in Shakespeare". It will be appreciated that the words "the" and "in" are considered stop words and matches to these words which are too prevalent will not be displayed; in effect the system ignores stop words. Thus, the search has two criteria which are treated alternatively such that any document having any one of the two words "law," "Shakespeare" will be a match, and the system will retrieve the document assuming a minimum ranking is satisfied and the maximum number of returns is not exceeded as described above and the date restriction is satisfied.

In step 331, the user views the search results of the second search after it is completed. Thus, for example, in the case of FIG. 5 after the first search is completed the status line 500 will show the number of matches if any to the search request and will also show the same information if there is such information in the lower portion of window 401. In step 333, the user may save the text of any selected document or retrieve the document in its original format by selecting icons 455 and 457 respectively as shown in FIG. 4b.

In the foregoing description, it has been assumed that the present invention is preferably carried out in a network of computer systems where there is a server computer system and a client computer system which are interconnected over the network. It will be appreciated that the method of the invention may also be practiced in a single computer system and the process of that single computer system performs multitasking in a conventional manner between the two search processes in order to allow the user of the single computer system to enter and execute at least two search requests concurrently.

Another aspect of the present invention relates to the manner in which updated information from a scheduled search is presented to the user in a summary format which is different than the format in which data is displayed from an immediate search, such as the format shown in FIGS. 4a and 5. This aspect of the present invention will be described with reference to FIGS. 6A, 6B, 7a, 7b, and 8.

Figure 7B:
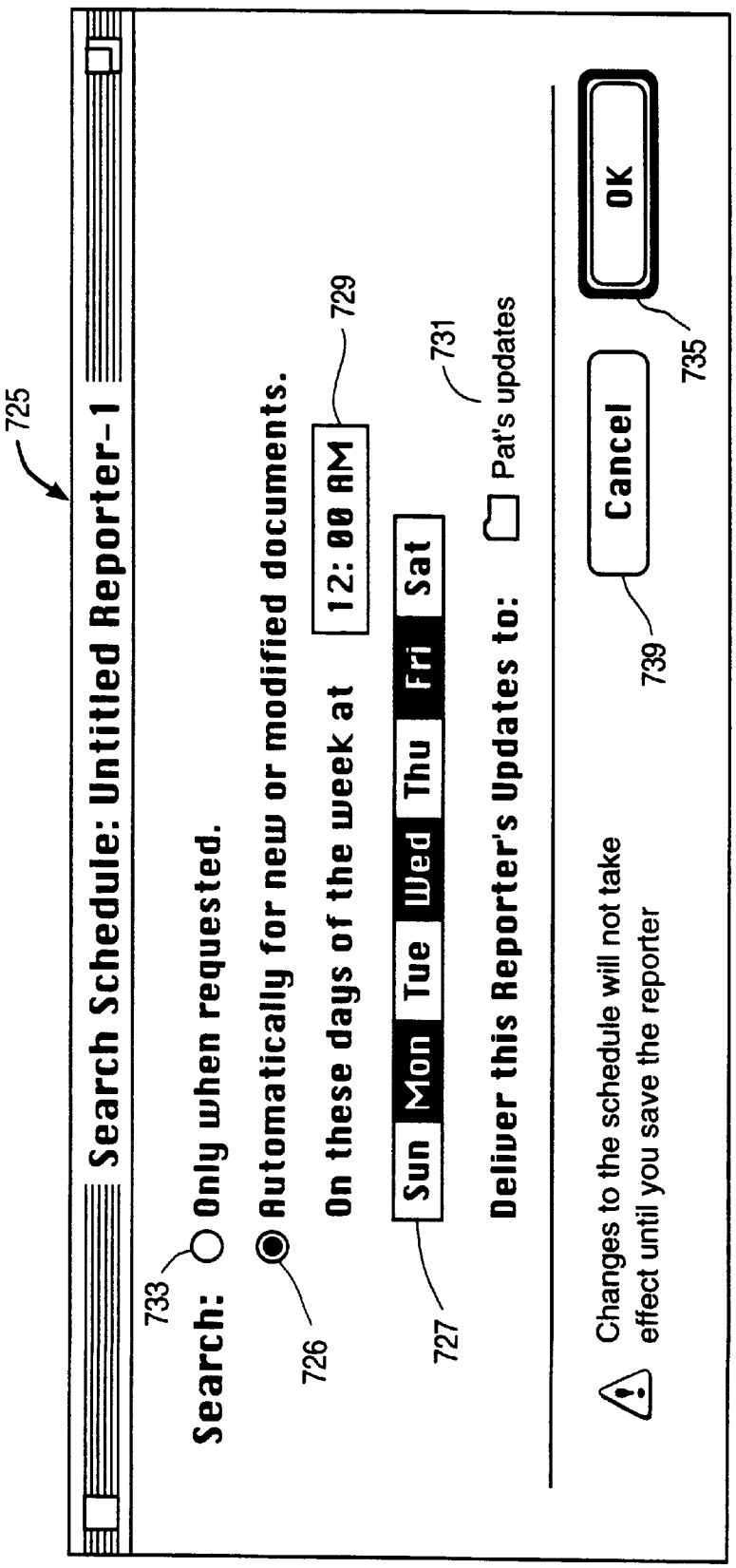
FIG. 7b shows an embodiment of a search scheduling window for entering data specifying the time and date of a scheduled search.

The process of this aspect of the present invention will be described in conjunction with FIGS. 6A and 6B while also referring to FIGS. 7a, 7b and 8. The process begins in step 601 in which the search software is launched on both the client and server systems. Then, in step 603, the client selects the particular search server; this step is similar to step 303 of FIG. 3a. Next, in step 605, the user creates a new search request window by requesting the software to provide a window such as window 401 as shown in FIG. 4a. Then, in step 607, the user selects the appropriate information sources where the user desires to search. In step 609, a search request is specified and the user, in one embodiment, schedules the times for the search request to be performed to search for new documents which have been added to the information sources which are selected for searching. In an alternative embodiment, the user schedules the times for summary reports to be generated for display to the user, where the reports result from searches which occur automatically when new documents are added to information sources which are selected for searching; in this embodiment, it is the report retrieval and preparation which is scheduled rather than the searching since the searching for such "scheduled" searches is performed when new documents are added.

In those systems of such alternative embodiment where documents should be indexed before searching, the search will typically be performed after indexing new documents and the search process would normally retrieve only those new documents. It is noted that, in this connection, "new" includes documents which previously existed prior to the search but have been modified after the search request has been created or after the last scheduled search.

In step 611, the user selects to save the scheduled search request on the server which was selected in step 603 such that a copy of the search request for the scheduled search is saved on the server system, such as server system 9; this would typically be saved in mass memory 17. The scheduling of the search occurs by the user selecting the scheduled search icon 437 as shown in FIG. 4a which causes a search scheduling window 725 to be displayed on the users display device, as shown in FIG. 7b. The user may specify that the search be performed only when requested, which may be considered a "immediate" search on demand when the user requests that the search be started by, for example, selecting the start search icon 433 as shown in FIG. 4a. However, normally the scheduled search will be selected by the user selecting the option marked with radio button 726 as shown in FIG. 7b. With this option, the system will, in one embodiment, automatically search at a scheduled search time for new and modified documents or, in the alternative embodiment, search anytime a new document is added to an information source (which would normally be selected in the scheduled search) and the scheduled time determines when the results of such search would be delivered to the requesting client system. The user can specify one or more days of the week and also specify the time in which the search (or retrieval of the search) is to begin. These are specified by entering the time in box 729 and by selecting the appropriate days of the week in bar 727. The search software in the server system 9 will receive this information along with the search parameters from the search request and store these typically in the mass memory 17 of the server computer system. If the user is satisfied with the time and the day selected and the location where the reports of the scheduled search will be delivered (as specified) in region 731 of the search schedule window 725 then user can select the okay button 735. Selecting the cancel button 739 will cause any selections to be canceled leaving the search scheduling window in its status prior to any changes. Typically, the default mode of the search scheduling window is that the search is not scheduled but rather only when requested by selecting radio button 733.

After the scheduled search request and its scheduled times have been saved by processor 10 in the server system 9 the server system performs, in the alternative embodiment, the scheduled search request when new documents are added or, in the other embodiment, waits until the first scheduled search time before performing the search. In either case, the search is deferred. Typically new or modified documents will be added to the information sources, usually under the control of the network administrator who operates the server computer system. This is shown in step 613. The addition of new or modified information in the information sources requires, in those searching systems which use indexing before searching, that the new information be indexed to reflect the newer modified information; these indexes are labeled with a date showing when they were last changed and each document which has been indexed is also saved so that the system will know which documents have been indexed and which have not. This indexing process is well known in the prior art and exist in such programs as Sonar and ZYindex. In the alternative embodiment, and when indexing before searching is used, newly indexed documents are searched using the scheduled search request after the new documents are indexed.

In step 617 which shows the one embodiment, the scheduled search request at the scheduled time causes performance of a scheduled search through the updated index for new documents which match the search parameters and which have last modified dates which are subsequent to the date that the search scheduled request was created in the case of a first scheduled search or subsequent to the last scheduled search. This also causes a report to be generated listing the documents found by the scheduled search request.

In the alternative embodiment, the searches will have been performed whenever new documents were added, and the client system will retrieve the report at the scheduled time. This report may include the document file names as well as other pertinent information including the complete text of the documents. According to one way of implementing a system according to the alternative embodiment, the addition of new documents will be followed by searching for documents modified (or added) since the last report was generated and delievered to a client system. This is accomplished by searching for documents which match the search request and which have a modification or creation date since the last report was delivered to a client system; the results of this search are saved in a list of such documents. Any subsequent addition of documents to an information source will be followed by another search for documents modified (or added) since the last report was generated and delivered to a client system, and the results of this search will be saved in a list of such documents (and the prior list need not be saved any more). This process continues until the scheduled time arrives, and then the most recently created list of such documents is used to deliver a report to the requesting client system, and this report may be in the summary format when delivered to the client system or be assembled into the summary format by the client system.

It will be appreciated that the scheduled search request will be causing retrieval of only those documents which are new to the information source as of the later of the last time the information source was searched by the scheduled search request or the creation of the scheduled search request. In a typical use, the user will make a first search request and request immediate execution and review the results of this search request in a search window such as that shown as window 401 in FIG. 4*a*. If the user believes the search request is adequate for the needs of the user, then the user may schedule this search request to be run periodically at scheduled times (or the results of future searches to be periodically retrieved at scheduled times) in order to find new documents which have been added to the information source or sources subsequent to the first search performed by the user. Thus, the scheduled search report can periodically provide the user with updates to the original report which updates show new documents (which include modified documents) added since the first search or added since prior scheduled searches.

In step 619, the user of a client system requests an update report from a scheduled search, which report was typically generated in step 617 from the results of a scheduled search. This report is subsequently displayed on a display device of the client system for the user to review, and the report is in a summary format which differs from the format of an immediately executed search such as that shown in window 401 of FIG. 4*a*. The display of the update report (in its summary format) is usually not immediately after the server system sends data corresponding to the report to the client system. FIG. 7*a* shows an example according to one embodiment of a report in summary format of a scheduled search. The update report window 701 shows the results of a scheduled search on documents concerning Charles Dickens. The summary format of the update reporter window 701 includes an indication 711 of the number of documents retrieved in the scheduled search as well as a status date 713 showing the date the scheduled search was performed. For each document which was retrieved in a particular scheduled search the summary information may include a date 715 on which the document was added to the information source and the name of the information source in a name field 717. Other items may be included in the summary format such as at least a portion of the title of the article or the document's file name as well as portions of the complete text which are displayed within region 703. Icons 719 may be used to select the full text of a particular article. The update report window 701 includes normal scrolling arrows 705 and 709 as well as a scrolling box 707 in order to allow the user to scroll through the report shown in window 701. Two complete reports in summary format for two documents are shown within window 701 as well as portions of two other reports in the lower portion of window 701.

The summary format may also include a listing which is a very abbreviated format for each document. The listing may comprise for each document a portion of the documents title or a portion of document's file name. For example, the first 31 characters of the document's title or file name may be displayed in the listing in a window 801 as shown in FIG. 8. This listing resembles a table of contents and allows the user to quickly see many more document titles at once for a particular update report from a scheduled search. As shown in FIG. 8, a table of contents listing shown in window 801 is shown for the update report window 701 for the update showing articles concerning Charles Dickens. A line of text is devoted to each article obtained in the scheduled search, and the selection of a particular line, such as line 830 in the listing will result in the display of the corresponding document in the summary format in window 701. In this manner, the user may select a particular title in window 801 and cause the summary format report for that document to appear in window 701. This provides the user with a quick and efficient way for navigating through the update reported window 701 and allows the user to pick and choose and quickly view the summary formats for each document retrieved in the scheduled search without having to use the scrolling arrows or the scroll box in the window 701. The user may select the full text for viewing of a particular document by selecting the icon 719 for the desired document and this will cause the document to be displayed in a window which is similar to the document viewer window shown in FIG. 4*b*; this may be performed in step 623, and the user may save or print the document depending on the user's needs.

Another aspect of the present invention will now be described with reference to FIGS. 9, 10, 11, and 12. This aspect relates to the maintenance of information sources in a network of computer systems and a method and apparatus for controlling the display of available information sources at client computer systems in the network.

Figure 9:
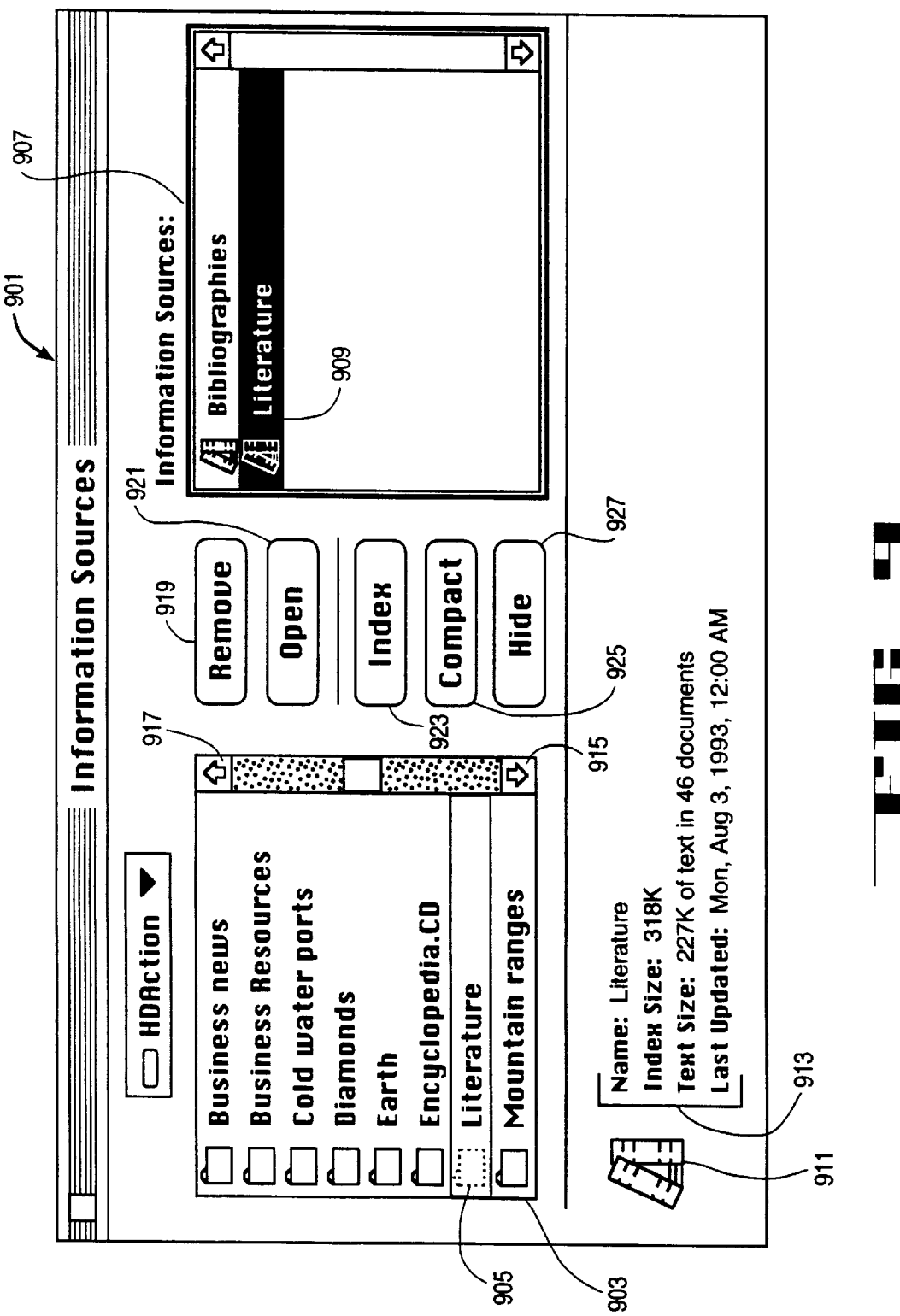
FIG. 9 shows an embodiment of an information sources window which may be displayed on a server computer system in a network according to the present invention.
Figure 10:
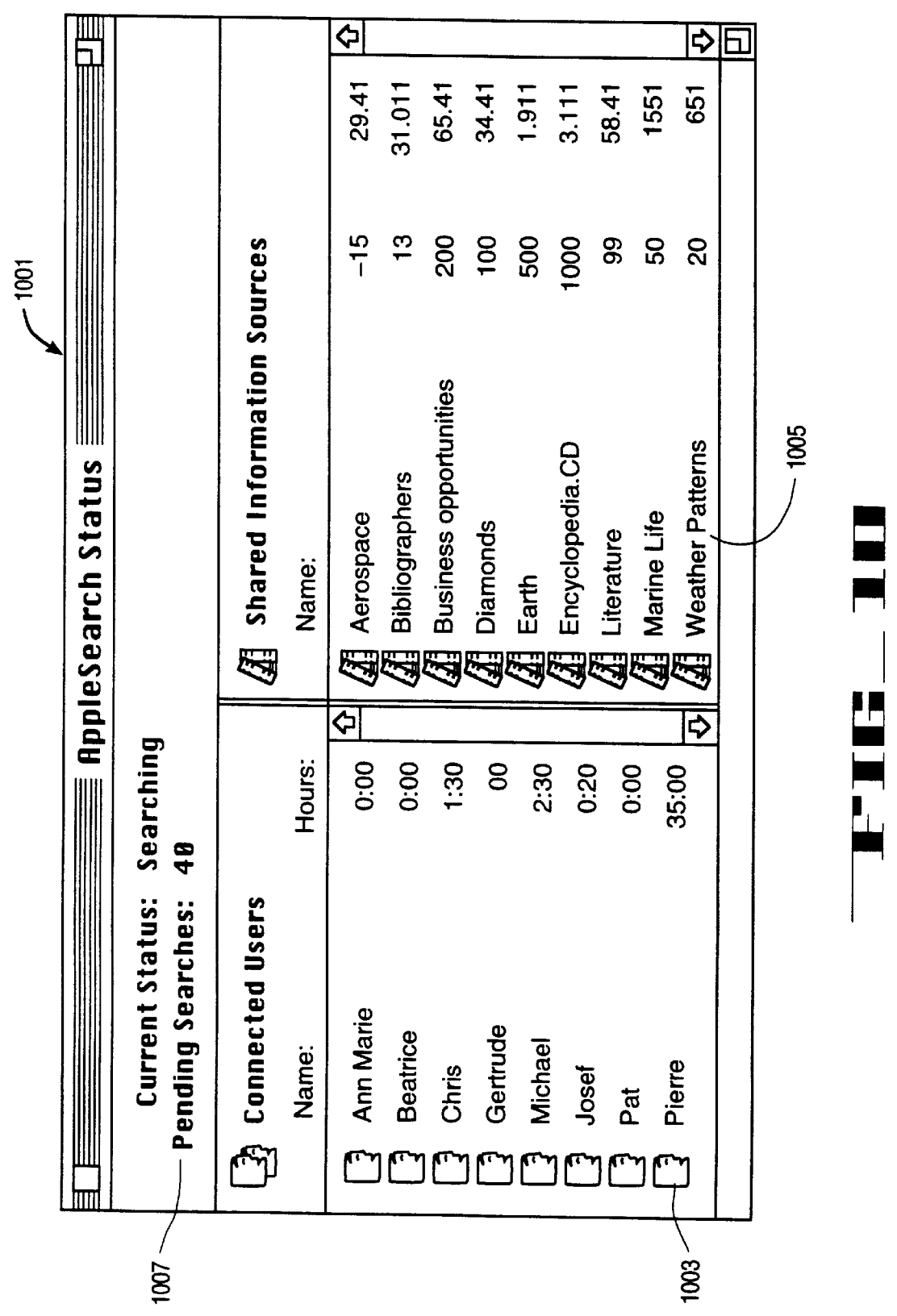

The apparatus of this aspect of the invention includes a server computer system 9 coupled through a network as described above to a client computer system 33. Each computer system, such as a server system 9 and the client system 33 will typically include a display device allowing the user of the system to view data indicating the status of the system, the status of the search as well as the information sources which are available for searching using the present invention. FIG. 9 shows an example of an information sources window 901 which is displayed on a display device 15 of the server computer system. Information sources window 1201 shown in FIG. 12 is an example of an information sources window which may be displayed on the display device 47 of the client computer system 33. Another status window which may be displayed is shown in FIG. 10, which is the search status window 1001. These information windows allow the users of the server and client computer systems to understand the status of the searching system of the present invention.

As noted above, in these information processing systems for searching for information in information sources, it is often necessary to perform maintenance on the documents within the information sources. This is particularly true where it is desired to maintain current information in these information sources. For example, in the case where an information source represents a periodical, newsletter or newspaper, it is often the most current news that a potential user would most desire. Consequently, a system administrator, which is typically an operator of the server computer system 9 is responsible for adding these documents to the appropriate information sources and, where the system requires that the documents be indexed prior to searching then causing these added documents (e.g. new documents, which includes modified documents) to be indexed so that they may be searched. As is well known, the indexing operation can consume a considerable amount of time during which the documents being indexed in an information source are unavailable for searching. There are other forms of maintenance which have been noted above which are also often necessary in such systems and these typically also require that the information source be not accessible for searching. The present invention provides a way to provide accurate information to users of client systems about the status of the searchability of information sources and allows the user of the server system to control the display of available information sources.

The method of this aspect of the present invention begins in step 1101 of FIG. 11 in which the user of the server system enters an information selection mode on the server computer system by causing the information sources window 901 to appear on the display device 15. This allows the user of the server system to select, typically from a variety of sources the possible information sources which are available for searching by the users of client systems in the network. The box 903 within information sources window 901 represents a listing of documents which are stored in at least one information storage device, such as mass memory 17, which is coupled to the network of data processing systems which includes the server system 9 as well as client systems such as client system 33. As shown in box 903, folders (e.g. directories) stored in an information storage device may be selected to be made available for use as an information source. This occurs typically by the user of the server system selecting an icon such as icon 905 representing a folder containing documents about literature and then selecting the add button 919 (which alternates between add and remove depending on whether the highlighted item is to the left or to the right respectively). That is, by selecting the icon 905 the button 919 will say "add" and the user may add these documents within the folder represented by icon 905 to the information sources by selecting the button 919, thereby causing the display which appears in FIG. 9.

While the information source 909 containing documents related to "literature" is highlighted as shown in FIG. 9, the user of the server system may hide this information source by selecting the hide button 927. This may be done in a number of well known ways in the computer user interface arts. For example, the user may position a cursor above the hide button 927 while the name of the information source has been selected and remains highlighted in the information sources box 907. Selecting "Hide" by selecting the button 927 causes, as shown in step 1105 the computer system to remove this information source from the display of client computer systems at some point in time after the information source was selected to be hidden. This period of time will depend on the particular implementation; in a first embodiment, it will depend upon how often the client systems check the availability of information sources by sending requests over the network to the server systems in order to determine the availability of various information sources. In any case, normally upon selecting and hiding an information source, the information source will not be available for searching by client systems, and client systems which selected an information source for searching and which request a search of the information source will receive an error message if the information source is hidden when the search request is received. In the first embodiment where "caching" of available information sources occurs on the client system, each client system while running the search application software will check with the server software on the server system 9 at most every 5 minutes to determine whether any information source has been hidden. After checking and determining that an information source has been hidden, the client system will no longer display that information source on a display device of the client's system. Thus, if the user of the server system selects the "literature" information source 909 and then selects the hide button 927 as shown in FIG. 9, then, at some point in time after that selection the client system 33 will determine that the literature information search is no longer available for searching and the indicia for this information search will be removed from the information sources window 1201 so that this information source will be "hidden" from the user of the client system 33. Thus, rather than displaying the indicia 1203 for the literature information source as shown in FIG. 12, this particular information source would not be shown as available within box 1205 of the information sources window 1201.

In a second embodiment (which for example does not use "caching" of information sources at the client systems), when an information source is selected and hidden on the server 9 (as in the first part of step 1105), any subsequent searches from the client system 33 will cause an error message to be displayed at client system 33 which indicates that an information source (previously selected for searching by the user of client system 33) is not available for searching. At least two versions of this second embodiment may be employed. In a first version of this second embodiment (which does not use "caching"), each time the user of a client system requests a listing of available information sources (e.g. through window 1201), the client system requests the server system to send (through the network) a list of available sources back to the client (rather than relying on a locally stored—cached—listing based on prior, not current, information). While the source remains hidden, any listing made after the source was hidden (even listings made substantially immediately after a source is hidden) of available information sources (for example through window 1201) on a client system's display will not show the hidden information source. In a second version of this second embodiment, the client system 33 will normally receive notification from the server system 9 that an information source has been hidden as soon as the source is hidden (allowing for network communication delay time), and the client system 33 will determine if the information source has been selected for searching and will notify the user of the client system immediately or upon the start of a search request. In either version of the second embodiment (which does not use "caching"), the client system 33 may send a search request (with its selected information sources) to the server system 9 and if an information source selected in the search request is not available, the server system 9 will send an error message back to client system 33 which will normally immediately display an error message on display 47 to the user of client system 33, and subsequent listings of available information sources on display 47 of client system 33 will not show the hidden information source. It will be appreciated that fewer error messages are possible in the second version because the server system notifies the client within the network communication delay period and thus most error messages are prevented by the notification being received by the client system before a search starts. In the first version of this second embodiment, error messages are more likely since the listing request is when the client requests a list of available sources. Since searches may be requested without requesting such a list, the result may be an error message that a selected source is no longer available.

During the time in which the information source is unavailable, the user of the server system may perform maintenance to the selected information source. For example, as shown in step 1107, the user of the server system may add new or modified documents and may index the newly modified information source. Upon completion of the maintenance of the information source, the user of the server system will typically make the hidden information source available for searching again by selecting a show button. This "show button" will appear in place of the hide button 927 when the information source has been selected for maintenance and thereby hidden. That is, the window 901 will have a show button rather than a hide button at button 927 when the literature information source 909 has been selected and hidden. By selecting an information source and the show button in information sources window 901, the user of the server system 9 makes the information source available again for searching.

In step 1111 which shows the first embodiment, the client systems will be periodically checking the status of information sources and after a certain period of time will determine that a previously hidden information source is now available again and will display an indicia of this information source within box 205 of the information sources window 1201.

In the second embodiment, the newly available information source will be displayed in a listing as soon as (after network communication delay) it is available from the server. Normally, the server system 9 will notify the client systems that a previously hidden source is now available as soon as the source is made available be selecting the "show" button. Any listings of information sources (for example, through window 1201 on display 47 of client system 33) will show the newly available source as soon as the source is made available by selecting the "show" button on the server (of course, allowing for network communication delay time which may delay the communication of the notification from the server to the client system).

While the present invention has been described with reference to numerous examples, interfaces and sequences of operation, it will be appreciated that numerous embodiments may be implemented from the present invention and the foregoing description is for purposes of illustration only and should not be taken to limit the scope of the following claims.

In the claims:

1. A method for processing information in a data processing system which is coupled to an information storage device having information stored in said information storage device, said method comprising:

defining on a first processor a first search request, said first search request including at least one first parameter which specifies a first type of desired information;

said first processor causing a first search to be performed of at least a first portion of said information using said first search request to determine whether said first type of desired information is stored in said information storage device;

while said first search is performed, defining on said first processor a second search request of said information, said second search request including at least one second parameter which specifies a second type of desired information; and, while said first search is performed, said first processor causing a second search to be performed of at least a second portion of said information using said second search request to determine whether said second type of desired information is stored in said information storage device.

2. A method as in claim 1 wherein said first search is performed on said first processor.

3. A method as in claim 2 wherein said second search is performed on one of said first processor and a second processor.

4. A method as in claim 3 wherein said first search and said second search are caused to be performed by the same software application.

5. A method as in claim 4 wherein said first search is not deferred.

6. A method as in claim 5 wherein said second search is not deferred.

7. A method as in claim 6 wherein said second search is not scripted.

8. A method as in claim 3 wherein said first search is not deferred.

9. A method as in claim 8 wherein said second search is not deferred.

10. A method as in claim 9 wherein said second search in not scripted.

11. A method as in claim 3 further comprising:
    displaying a first search report showing a first result of performing a first search.

12. A method as in claim 11 further comprising:
    displaying a second search report showing a second result of performing a second search.

13. A method as in claim 3 wherein said information comprises a plurality of documents having data in character format and wherein said method further comprises prior to performing said first and said second searches, indexing said plurality of documents to create an indexed list of words in said plurality of documents, and wherein performing said first and second searches comprises searching said indexed list of words.

14. A method as in claim 12 wherein said information comprises a plurality of documents having data in character format and wherein at least a portion of said information is stored at a remote location and wherein said first result comprises a first list of at least one name representing a first document within said plurality of documents and said second result comprises a second list of at least one name representing a second document of said plurality of documents, and wherein said method further comprises displaying said first document in character format for viewing by a user.

15. A method as in claim 12 wherein said first search request is defined within a first window and said first search report is displayed within said first window, and wherein said second search request and said second search report are displayed within a second window.

16. A method as in claim 14 wherein said first search request is defined within a first window and said first search report is displayed within said first window, and wherein said second search request and said second search report are displayed within a second window.

17. A method as in claim 14 further comprising:
    prior to performing said first and said second searches, indexing said plurality of documents to create an indexed list of words in said plurality of documents, and wherein performing said first and said second searches comprises searching said indexed list of words.

18. A method as in claim 16 further comprising:
    prior to performing said first and said second searches, indexing said plurality of documents to create an indexed list of words in said plurality of documents, and wherein performing said first and said second searches comprises searching said indexed list of words.

19. A method as in claim 18 wherein said at least one parameter comprises at least one word and said first type of desired information comprise at least one document which includes said at least one word.

20. An apparatus for processing information in a data processing system comprising:
   an information storage device having information stored in said information storage device;
   a first processor coupled to said information storage device;
   a first input device coupled to said first processor, said input device for defining a first search request which includes at least one first parameter which specifies a first type of desired information, and for defining a second search request which includes at least one second parameter which specifies a second type of desired information;
   a first memory coupled to said first processor, said first memory for storing said first search request, said first processor using said first search request to perform a first search of at least a first portion of said information to determine whether said first type of desired information is stored in said information storage device, and said first processor, while performing said first search, causing to be performed another searching process wherein said first memory stores said second search request of said information, said first processor using said second research request to perform a second search of at least a second portion of said information to determine whether said second type of desired information is stored in said information storage device.

21. An apparatus as in claim 20 further comprising a first display coupled to said first processor, said first processor displaying on said first display a first search report showing a first result of performing said first search, and wherein said first type of desired information comprises a plurality of documents having data in character format.

22. An apparatus as in claim 21 further comprising:
   a second processor coupled to said first display and coupled to said first input device;
   a first network interface coupled to said first processor;
   a second network interface coupled to said second processor;
   a network coupler coupled to said first network interface and to said second network interface, wherein said first search request is sent over said network coupler from said first input device, through said first and said second network interfaces, to said first processor.

23. An apparatus as in claim 22 wherein said second search request is sent over said network coupler from said first input device, through said first and said second network interfaces, to said second processor.

24. An apparatus as in claim 20 wherein said first processor, prior to performing said first and said second searches, indexes said plurality of documents to create an indexed list of words in said plurality of documents and wherein said indexed list of words is stored in said information storage device and said first processor, when performing said first and said second searches, searches said indexed list of words.

25. An apparatus as in claim 21 wherein at least said first parameter from said first search request is displayed within a first window and wherein said first result is displayed within said first window, and wherein at least said second parameter from said second search request is displayed within a second window and wherein said second result is displayed within said second window.

26. A computer readable storage medium for use in a data processing system which is coupled to an information storage device having information stored in said information storage device, said computer readable storage medium containing executable computer program instructions, which when executed by a digital processing system cause the digital processing system to perform a method comprising:
   defining on a first processor a first search request, said first search request including at least one first parameter which specifies a first type of desired information;
   said first processor causing a first search to be performed of at least a first portion of said information using said first search request to determine whether said first type of desired information is stored in said information storage device;
   while said first search is performed, defining on said first processor a second search request of said information, said second search request including at least one second parameter which specifies a second type of desired information; and,
   while said first search is performed, said first processor causing a second search to be performed of at least a second portion of said information using said second search request to determine whether said second type of desired information is stored in said information storage device.

27. A computer readable storage medium as in claim 26 wherein said first search is performed on said first processor.

28. A computer readable storage medium as in claim 27 wherein said second search is performed on one of said first processor and a second processor.

29. A computer readable storage medium as in claim 28 wherein said first search and said second search are caused to be performed by the same software application.

30. A computer readable storage medium as in claim 29 wherein said first search is not deferred.

31. A computer readable storage medium as in claim 30 wherein said second search is not deferred.

32. A computer readable storage medium as in claim 31 wherein said second search in not scripted.

33. A computer readable storage medium as in claim 28 wherein said first search is not deferred.

34. A computer readable storage medium as in claim 33 wherein said second search is not deferred.

35. A computer readable storage medium as in claim 34 wherein said second search in not scripted.

36. A computer readable storage medium as in claim 28 further comprising:
   displaying a first search report showing a first result of performing a first search.

37. A computer readable storage medium as in claim 36 further comprising:
   displaying a second search report showing a second result of performing a second search.

38. A computer readable storage medium as in claim 28 wherein said information comprises a plurality of documents having data in character format and wherein, prior to performing said first and said second searches, indexing said plurality of documents to create an indexed list of words in said plurality of documents, and wherein performing said first and second searches comprises searching said indexed list of words.

39. A computer readable storage medium as in claim 37 wherein said information comprises a plurality of documents having data in character format and wherein at least a portion of said information is stored at a remote location and wherein said first result comprises a first list of at least one name representing a first document within said plurality of documents and said second result comprises a second list of at least one name representing a second document of said plurality of documents, and wherein said first document is displayed in character format for viewing by a user.

40. A computer readable storage medium as in claim 37 wherein said first search request is defined within a first window and said first search report is displayed within said first window, and wherein said second search request and said second search report are displayed within a second window.

41. A computer readable storage medium as in claim 39 wherein said first search request is defined within a first window and said first search report is displayed within said first window, and wherein said second search request and said second search report are displayed within a second window.

42. A computer readable storage medium as in claim 39 further comprising:
 prior to performing said first and said second searches, indexing said plurality of documents to create an indexed list of words in said plurality of documents, and wherein performing said first and said second searches comprises searching said indexed list of words.

43. A computer readable storage medium as in claim 41 further comprising:
 prior to performing said first and said second searches, indexing said plurality of documents to create an indexed list of words in said plurality of documents, and wherein performing said first and said second searches comprises searching said indexed list of words.

44. A computer readable storage medium as in claim 43 wherein said at least one parameter comprises at least one word and said first type of desired information comprise at least one document which includes said at least one word.

45. An apparatus for processing information in a data processing system which is coupled to an information storage device having information stored in said information storage device, comprising:
 means for defining on a first processor a first search request, said first search request including at least one first parameter which specifies a first type of desired information;
 means for causing a first search to be performed of at least a first portion of said information using said first search request to determine whether said first type of desired information is stored in said information storage device;
 means for defining on said first processor, while said first search is performed, a second search request of said information, said second search request including at least one second parameter which specifies a second type of desired information; and,
 means for causing, while said first search is performed, a second search to be performed of at least a second portion of said information using said second search request to determine whether said second type of desired information is stored in said information storage device.

46. An apparatus as in claim 45 wherein said first search is performed on said first processor.

47. An apparatus as in claim 46 wherein said second search is performed on one of said first processor and a second processor.

48. An apparatus as in claim 47 wherein said first search and said second searches are caused to be performed by the same software application.

49. An apparatus as in claim 48 wherein said first search is not deferred.

50. An apparatus as in claim 47 wherein said second search is not deferred.

51. An apparatus as in claim 50 wherein said second search in not scripted.

52. An apparatus as in claim 47 wherein said first search is not deferred.

53. An apparatus as in claim 52 wherein said second search is not deferred.

54. An apparatus as in claim 53 wherein said second search in not scripted.

55. An apparatus as in claim 47 further comprising:
 means for displaying a first search report showing a first result of performing a first search.

56. An apparatus as in claim 55 further comprising:
 means for displaying a second search report showing a second result of performing a second search.

57. An apparatus as in claim 47 wherein said information comprises a plurality of documents having data in character format and wherein said apparatus further comprises prior to performing said first and said second searches, means for indexing said plurality of documents to create an indexed list of words in said plurality of documents, and wherein performing said first and second searches comprises means for searching said indexed list of words.

58. An apparatus as in claim 56 wherein said information comprises a plurality of documents having data in character format and wherein at least a portion of said information is stored at a remote location and wherein said first result comprises a first list of at least one name representing a first document within said plurality of documents and said second result comprises a second list of at least one name representing a second document of said plurality of documents, and wherein said apparatus further comprises means for displaying said first document in character format for viewing by a user.

59. An apparatus as in claim 56 wherein said first search request is defined within a first window and said first search report is displayed within said first window, and wherein said second search request and said second search report are displayed within a second window.

60. An apparatus as in claim 58 wherein said first search request is defined within a first window and said first search report is displayed within said first window, and wherein said second search request and said second search report are displayed within a second window.

61. An apparatus as in claim 58 further comprising:
 means for indexing said plurality of documents, prior to performing said first and said second searches, to create an indexed list of words in said plurality of documents, and wherein said means for performing said first and said second searches, searches said indexed list of words.

62. An apparatus as in claim 60 further comprising:
 means for indexing said plurality of documents, prior to performing said first and said second searches, to create an indexed list of words in said plurality of documents, and wherein said means for performing said first and said second searches, searches said indexed list of words.

63. An apparatus as in claim 62 wherein said at least one parameter comprises at least one word and said first type of desired information comprise at least one document which includes said at least one word.

* * * * *